US009159095B1

(12) United States Patent
Smith

(10) Patent No.: US 9,159,095 B1
(45) Date of Patent: Oct. 13, 2015

(54) DATABASE DRIVEN COMPUTER SYSTEMS PROVIDING REAL-TIME UPDATABLE GRAPHICAL USER INTERFACES TO TRACK REAL-TIME VALUE OF AIRINGS

(71) Applicant: I-PREDICTUS, Parsippany, NJ (US)

(72) Inventor: Monica C. Smith, Parsippany, NJ (US)

( * ) Notice: Subject to any disclaimer, the term of this patent is extended or adjusted under 35 U.S.C. 154(b) by 0 days.

(21) Appl. No.: 14/661,976

(22) Filed: Mar. 18, 2015

Related U.S. Application Data

(60) Provisional application No. 61/954,695, filed on Mar. 18, 2014.

(51) Int. Cl.
*G06Q 30/00* (2012.01)
*G06Q 30/06* (2012.01)
*G06Q 30/02* (2012.01)
*G06F 17/30* (2006.01)
*G06F 3/0484* (2013.01)

(52) U.S. Cl.
CPC ........ *G06Q 30/0641* (2013.01); *G06F 3/04842* (2013.01); *G06F 17/30339* (2013.01); *G06F 17/30371* (2013.01); *G06F 17/30876* (2013.01); *G06Q 30/0207* (2013.01); *G06Q 30/0281* (2013.01)

(58) Field of Classification Search
CPC ................................................ G06Q 30/0207
See application file for complete search history.

(56) References Cited

U.S. PATENT DOCUMENTS

| 8,121,898 B2* | 2/2012 | Altberg et al. ............. 705/14.73 |
| 2009/0063274 A1* | 3/2009 | Dublin et al. .................. 705/14 |
| 2011/0066498 A1* | 3/2011 | Wojcicki et al. ........... 705/14.55 |

* cited by examiner

*Primary Examiner* — John G Weiss
*Assistant Examiner* — Scott C Anderson
(74) *Attorney, Agent, or Firm* — Greenberg Traurig, LLP

(57) ABSTRACT

In some embodiments, the present invention is directed to database driven computer systems providing real-time updatable graphical user interfaces to track real-time value of airings, including: a specifically programmed server; a database accessible by the server, where the server includes a plurality of modules configured to perform: electronically and periodically obtaining media data, web tracking transaction data, call center transaction data, and fulfillment transaction data; associating, in real time, media data records of airings of creatives to fulfillment transaction records by matching records among database tables having media data, web tracking transaction data, call center transaction data, and fulfillment transaction data; continuously calculating, in real-time, a current value of a particular airing of a particular creative; and displaying a graphical user interface, including real-time updated look-up items, outputting one or more real-time report based at least on the continuously calculating the current value of the particular airing.

18 Claims, 9 Drawing Sheets

| TagID | TagCode | FulfillmentOrderID | FulfillmentDPID | FulfillmentDPCode | MarketerID | MarketerCode | OfferID | OfferCode | FulfillmentOrderNumber |
|---|---|---|---|---|---|---|---|---|---|
| 1 | MSI \|\| PRO \|\| FDM4 \|\| M59021300 | 1 | 3 | FDM4 | 1 | PRO | 164 | ROEN140816A | M59021300 |
| 2 | MSI \|\| PRO \|\| FDM4 \|\| M59021470 | 2 | 3 | FDM4 | 1 | PRO | 178 | SWEN140929A | M59021470 |
| 3 | MSI \|\| PRO \|\| FDM4 \|\| M59021490 | 3 | 3 | FDM4 | 1 | PRO | 178 | SWEN140929A | M59021490 |
| 4 | MSI \|\| PRO \|\| FDM4 \|\| M59021500 | 4 | 3 | FDM4 | 1 | PRO | 178 | SWEN140929A | M59021500 |
| 5 | MSI \|\| PRO \|\| FDM4 \|\| M59021530 | 5 | 3 | FDM4 | 1 | PRO | | | M59021530 |
| 6 | MSI \|\| PRO \|\| FDM4 \|\| M59021580 | 6 | 3 | FDM4 | 1 | PRO | | | M59021580 |
| 7 | MSI \|\| PRO \|\| FDM4 \|\| M59021620 | 7 | 3 | FDM4 | 1 | PRO | 3372 | SWPL08PPC | M59021620 |
| 8 | MSI \|\| PRO \|\| FDM4 \|\| M59021630 | 8 | 3 | FDM4 | 1 | PRO | 3372 | SWPL08PPC | M59021630 |
| 9 | MSI \|\| PRO \|\| FDM4 \|\| M59021640 | 9 | 3 | FDM4 | 1 | PRO | 3372 | SWPL08PPC | M59021640 |
| 10 | MSI \|\| PRO \|\| FDM4 \|\| M59021650 | 10 | 3 | FDM4 | 1 | PRO | 3372 | SWPL08PPC | M59021650 |
| 11 | MSI \|\| PRO \|\| FDM4 \|\| M59021660 | 11 | 3 | FDM4 | 1 | PRO | 3371 | SWPL08W | M59021660 |

FIG. 4

| Country | | |
|---|---|---|
| Language | English | |
| Division* | Vacuum | |
| Department* | Uprights | |
| Creative* | ROEN150215A | Offer* | ROHV21B |
| Campaign* | Rocket | Broadcast Year* | 2015 |
| | | Broadcast Weeks of* | 12/19/14-01/19/15 |
| | | Network/Station* | CNBC |
| | | Day of Week | Saturday |
| | | Time Slot | 8:00AM - 8:30AM |
| Airing Length | 28:30:00 | | |

FIG. 5

| Division | Vacuum | |
|---|---|---|
| Department | Uprights | |
| Creative: | HV300 Offer 21 (5 x $39.95 FSH) w/S3251 & Warranty - No Upgrade | |
| Offer: | HV300 Offer 21 (5 x $39.95 FSH) w/S3251 & Warranty - No Upgrade | |
| | Airing: Saturday, CNBC, 8:00AM - 8:30AM | |
| | | |
| Media Cost | $52,000.00 | |
| Initial Gross Revenue | $123,500.00 | |
| Cancelled Revenue | $3,578.00 | |
| CC Decline Revenue | $1,171.50 | |
| Returns | $5,257.50 | |
| Discounts | $808.00 | |
| Net Revenue | $112,685.00 | |
| COGS/Landed Cost | $48,454.55 | |
| Cancelled & Declined CoGS | $2,042.29 | |
| Returned CoGS | $2,260.73 | |
| Telemarketing Fee | $5,928.00 | |
| Fulfillment Fee | $2,717.00 | |
| Customer Service Fee | $1,235.00 | |
| Cost of Repair | $494.00 | |
| Royalties | | |
| Gross Cost of Sales | $63,131.56 | |
| Unsalvageable Returns | $678.22 | |
| Bad Debt | $7,410.00 | |
| Adjusted Cost of Sales | $71,219.78 | |
| Gross Margin | $41,465.22 | |
| Target Profit & Overhead | $0.00 | |
| Net Margin | ($10,534.78) | |
| Net Margn/Airing | ($5,267.39) | |
| ROI | -20% | |
| Subsidy | 80% | |

FIG. 6

| Division | Vacuum | Vacuum |
| --- | --- | --- |
| Department | Uprights | Uprights |
| Creative: | HV300 Offer 21 (5 x $39.95 FSH) w/S3251 & Warranty - No Upgrade | HV300 Offer 21 (5 x $39.95 FSH) w/S3251 & Warranty - No Upgrade |
| Offer: | HV300 Offer 21 (5 x $39.95 FSH) w/S3251 & Warranty - No Upgrade | HV300 Offer 21 (5 x $39.95 FSH) w/S3251 & Warranty - No Upgrade |
| | AirIng: Saturday, CNBC, 8:00AM - 8:30AM | AirIng: Saturday, USA, 8:00AM - 8:30AM |
| | | |
| Media Cost | $52,000.00 | $32,000.00 |
| Initial Gross Revenue | $123,500.00 | $68,500.00 |
| Cancelled Revenue | $3,578.00 | $2,192.00 |
| CC Decline Revenue | $1,171.50 | $753.50 |
| Returns | $5,257.50 | $3,219.50 |
| Discounts | $808.00 | $411.00 |
| Net Revenue | $112,685.00 | $61,924.00 |
| COGS/Landed Cost | $48,454.55 | $26,627.32 |
| Cancelled & Declined CoGS | $2,042.29 | $1,266.57 |
| Returned CoGS | $2,260.73 | $1,384.39 |
| Telemarketing Fee | $5,928.00 | $3,288.00 |
| Fulfillment Fee | $2,717.00 | $1,507.00 |
| Customer Service Fee | $1,235.00 | $685.00 |
| Cost of Repair | $494.00 | $205.50 |
| Royalties | $0.00 | |
| Gross Cost of Sales | $63,131.56 | $34,963.77 |
| Unsalvageable Returns | $678.22 | $415.32 |
| Bad Debt | $7,410.00 | $4,110.00 |
| Adjusted Cost of Sales | $71,219.78 | $39,489.09 |
| Gross Margin | $41,465.22 | $22,434.91 |
| Target Profit & Overhead | $0.00 | $0.00 |
| Net Margin | ($10,534.78) | ($9,565.09) |
| Net Margin/Airing | ($5,267.39) | ($9,565.09) |
| ROI | -20% | -30% |
| Subsidy | 80% | 70% |

FIG. 7

| Division | Vacuum | Vacuum |
| --- | --- | --- |
| Department | Uprights | Uprights |
| Creative: | HV300 Offer 21 (5 x $39.95 FSH) w/S3251 & Warranty - No Upgrade | HV300 Offer 22 (5 x $39.95 FSH) w/S3251 & Warranty - JD Power (No Upgrade) REV |
| Offer: | HV300 Offer 21 (5 x $39.95 FSH) w/S3251 & Warranty - No Upgrade | HV300 Offer 22 (5 x $39.95 FSH) w/S3251 & Warranty - JD Power (No Upgrade) REV |
| Airing: | Saturday, CNBC, 8:00AM - 8:30AM | Airing: Saturday, CNBC, 8:00AM - 8:30AM |
| | | |
| Media Cost | $26,000.00 | $26,000.00 |
| Initial Gross Revenue | $60,000.00 | $53,525.00 |
| Cancelled Revenue | $1,800.00 | $1,498.70 |
| CC Decline Revenue | $600.00 | $481.73 |
| Returns | $2,400.00 | $2,408.63 |
| Discounts | $300.00 | $428.20 |
| Net Revenue | $54,900.00 | $48,707.75 |
| COGS/Landed Cost | $23,607.00 | $20,944.33 |
| Cancelled & Declined CoGS | $1,032.00 | $851.58 |
| Returned CoGS | $1,032.00 | $1,035.71 |
| Telemarketing Fee | $2,880.00 | $2,569.20 |
| Fulfillment Fee | $1,320.00 | $1,177.55 |
| Customer Service Fee | $600.00 | $535.25 |
| Cost of Repair | $240.00 | $214.10 |
| Royalties | | |
| Gross Cost of Sales | $30,711.00 | $27,327.72 |
| Unsalvageable Returns | $309.60 | $310.71 |
| Bad Debt | $3,600.00 | $3,211.50 |
| Adjusted Cost of Sales | $34,620.60 | $30,849.94 |
| Gross Margin | $20,279.40 | $17,857.81 |
| Target Profit & Overhead | $0.00 | $0.00 |
| Net Margin | ($5,720.60) | ($8,142.19) |
| ROI | -22% | -31% |
| Subsidy | 78% | 69% |

FIG. 8

| Division | Vacuum | Vacuum | Vacuum | Vacuum | Vacuum |
|---|---|---|---|---|---|
| Department | Uprights | Uprights | Uprights | Uprights | Uprights |
| Creative: | HV300 Offer 21 (5 x $39.95 FSH) w/S3251 & Warranty - No Upgrade | HV300 Offer 21 (5 x $39.95 FSH) w/S3251 & Warranty - No Upgrade | HV300 Offer 22 (5 x $39.95 FSH) w/S3251 & Warranty (No Upgrade) REV | HV300 Offer 22 (5 x $39.95 FSH) w/S3251 & Warranty - JD Power (No Upgrade) REV | HV300 Offer 22 (5 x $39.95 FSH) w/S3251 & Warranty - JD Power (No Upgrade) REV |
| Offer: | HV300 Offer 21 (5 x $39.95 FSH) w/S3251 & Warranty - No Upgrade | HV300 Offer 21 (5 x $39.95 FSH) w/S3251 & Warranty - No Upgrade | HV300 Offer 22 (5 x $39.95 FSH) w/S3251 & Warranty (No Upgrade) REV | HV300 Offer 22 (5 x $39.95 FSH) w/S3251 & Warranty - JD Power (No Upgrade) REV | HV300 Offer 22 (5 x $39.95 FSH) w/S3251 & Warranty - JD Power (No Upgrade) REV |
| Airing: | Saturday, CNBC, 8:00AM - 8:30AM | Saturday, USA, 8:00AM - 8:30AM | Saturday, CNBC, 8:00AM - 8:30AM | Saturday, SYFY, 8:00AM - 8:30AM | Saturday, Lifetime, 8:00AM - 8:30AM |
| Media Cost | $26,000.00 | $22,000.00 | $52,000.00 | $40,000.00 | $35,000.00 |
| Initial Gross Revenue | $60,000.00 | $46,226.00 | $109,522.00 | $78,552.00 | $68,820.00 |
| Cancelled Revenue | $1,800.00 | $1,294.33 | $3,066.62 | $2,199.46 | $1,720.50 |
| CC Decline Revenue | $600.00 | $462.26 | $985.70 | $942.62 | $619.38 |
| Returns | $2,400.00 | $1,849.04 | $4,928.49 | $3,534.84 | $3,785.10 |
| Discounts | $300.00 | $231.13 | $876.18 | $706.97 | $688.20 |
| Net Revenue | $54,900.00 | $42,389.24 | $99,665.02 | $71,168.11 | $62,006.82 |
| COGS/Landed Cost | $23,607.00 | $18,227.37 | $42,855.96 | $30,602.29 | $26,662.93 |
| Cancelled & Declined CoGS | $1,032.00 | $755.33 | $1,742.50 | $1,351.09 | $1,006.15 |
| Returned CoGS | $1,032.00 | $795.09 | $2,119.25 | $1,519.98 | $1,627.59 |
| Telemarketing Fee | $2,880.00 | $2,218.85 | $5,257.06 | $3,770.50 | $3,303.36 |
| Fulfillment Fee | $1,320.00 | $1,016.97 | $2,409.48 | $1,728.14 | $1,514.04 |
| Customer Service Fee | $600.00 | $462.26 | $1,095.22 | $785.52 | $688.20 |
| Cost of Repair | $240.00 | $184.90 | $438.09 | $314.21 | $275.28 |
| Royalties | | | | | |
| Gross Cost of Sales | $30,711.00 | $23,660.78 | $55,917.55 | $40,071.73 | $35,077.55 |
| Unsalvageable Returns | $309.60 | $238.53 | $635.78 | $455.99 | $488.28 |
| Bad Debt | $3,600.00 | $2,773.56 | $6,571.32 | $4,713.12 | $4,129.20 |
| Adjusted Cost of Sales | $34,620.60 | $26,672.86 | $63,124.65 | $45,240.85 | $39,695.03 |
| Gross Margin | $20,279.40 | $15,716.38 | $36,540.37 | $25,927.27 | $22,311.79 |
| Target Profit & Overhead | $0.00 | $0.00 | $0.00 | $0.00 | $0.00 |
| Net Margin | ($5,720.60) | ($6,283.62) | ($15,459.63) | ($14,072.73) | ($12,683.21) |
| ROI | -22% | -29% | -30% | -35% | -36% |
| Subsidy | 78% | 71% | 70% | 65% | 64% |

FIG. 9

DATABASE DRIVEN COMPUTER SYSTEMS PROVIDING REAL-TIME UPDATABLE GRAPHICAL USER INTERFACES TO TRACK REAL-TIME VALUE OF AIRINGS

RELATED APPLICATIONS

This application claims the priority of U.S. provisional application U.S. Patent Appln. No. 61/954,695; filed Mar. 18, 2014; entitled "Analytical tool to measure the short and long term value of media investments in the direct to consumer advertising space and create a buyer profile for the media source," which is incorporated herein by reference in its entirety for all purposes.

TECHNICAL FIELD

In some embodiments, the present invention relates generally to database driven computer systems providing real-time updatable graphical user interfaces to track real-time value of airings.

BACKGROUND

For example, in the realm of Direct Response Television (DRTV), a marketer makes an offer to the viewer to purchase or to inquire about a package of products or services, or to pledge a donation, by calling a toll free number and/or visiting a specific URL through individual broadcast airings of a paid commercial program of 28:30 in length (infomercial) or a commercial message of varying lengths equal to or less than five minutes.

BRIEF SUMMARY

In some embodiments, the present invention is directed to database driven computer systems providing real-time updatable graphical user interfaces to track real-time value of airings. In some embodiments, the instant invention provides for a computer system, including: at least one specifically programmed server; at least one non-transitory tagging database accessible by the at least one specifically programmed server, where the at least one non-transitory tagging database is specifically programmed to be dedicated for use by the at least one specifically programmed server; where the at least one specifically programmed server comprises a plurality of modules configured to perform at least the following operations: electronically and periodically obtaining, by a media data programmed computer interface module of the at least one specifically programmed server, over a computer network, media data from a plurality of computer systems of media data sources, where the media data is associated with a plurality of marketers; verifying, by the media data programmed computer interface module of the at least one specifically programmed server, the media data in accordance with at least one predetermined media data database schema; populating, by the media data programmed computer interface module of the at least one specifically programmed server, media agency records of airings in at least one media data table of the at least one non-transitory tagging database based, at least in part, on: i) the media data, and ii) the at least one predetermined media data database schema; where the at least one predetermined media data database schema, including: a) at least one data field for marketer code identifier, b) at least one data field for creative code identifier, c) at least one data field for offer code identifier, d) at least one data field for network/station code identifier, e) at least one data field for date code identifier, f) at least one data field for time slot code identifier, g) at least one data field for payment type code identifier, h) at least one data field for phone number code identifier, i) at least one data field for internet address code identifier, j) at least one data field for response metric code identifier, k) at least one data field for country code identifier, l) at least one data field for language code identifier, and m) at least one data filed for airing length identifier; assigning, in real-time, by the media data programmed computer interface module of the at least one specifically programmed server, at least one media agency record identifier to each media data record in the at least one media data table, where each media data record corresponds to a particular airing of a particular creative; electronically and periodically obtaining, by a web data programmed computer interface module of the at least one specifically programmed server, over a computer network, web tracking transaction data from a computer system of at least one web tracking electronic source; where the web tracking transaction data including: i) web tracking metrics for at least one website associated with at least one offer of at least one creative, and ii) transactional web data for web orders made via the at least one website associated with the at least one offer of at least one creative; verifying, by the web data programmed computer interface module of the at least one specifically programmed server, the web tracking transaction data in accordance with at least one predetermined web tracking transaction database schema; populating, by the web data programmed computer interface module of the at least one specifically programmed server, at least one web data table in the at least one non-transitory tagging database based on the web tracking transaction data; electronically and periodically obtaining, by a call center data programmed computer interface module of the at least one specifically programmed server, over a computer network, call center transaction data from a computer system at least one call center electronic source; where the call center transaction data including: i) call center metrics for at least one phone number associated with the at least one offer of the at least one creative, and ii) transactional call center data for call-center orders made via the at least one phone number associated with the at least one offer of the at least one creative; verifying, by the call center data programmed computer interface module of the at least one specifically programmed server, the call center transaction data in accordance with at least one predetermined call center transaction database schema; populating, by the call center data programmed computer interface module of the at least one specifically programmed server, at least one call center data table in the at least one non-transitory tagging database based on the call center transaction data; electronically and real-time obtaining, over a computer network, by a fulfillment data programmed computer interface module of the at least one specifically programmed server, from a computer system of at least one fulfillment electronic source, fulfillment transaction data; where the fulfillment transaction data including a plurality of at least thousand fulfillment records associated a plurality of at least thousand fulfillment transactions for the web orders, the call-center orders, or both; where each fulfillment record identifies each fulfillment transaction being associated with a web order or a call-center order; verifying, by the fulfillment data programmed computer interface module of the at least one specifically programmed server, the fulfillment transaction data in accordance with at least one predetermined fulfillment transaction database schema; populating, by the fulfillment data programmed computer interface module of the at least one specifically programmed server, at least one fulfillment data table in the at least one non-transitory tagging database based on the fulfillment transaction data; for each fulfillment transaction, determining, by the fulfillment data programmed computer interface module of the at least one specifically programmed server, a transaction type, where the transaction type is selected from the group of: i) a new web order, ii) a new call-center order, iii) a new parts order for a replacement part, accessory, or both; iv) a repair, v) a return, vi) a cancellation, vii) a backorder, viii) an installment payment, and ix) a partial refund/discount; associating, in real time, by a tagging data programmed computer module of the at least one specifically programmed server, media data records of airings of creatives to fulfillment transaction records in the at least one fulfillment data table, by matching, in real-time, records among at least the following data tables: i) the at least one media data table; ii) the at least one web data table, iii) the at least one call center data table, and iv) the at least one fulfillment data table; for the matched records, continuously updating, in real-time, by the tagging data programmed computer module of the at least one specifically programmed server, at least one master records data table of the at least one non-transitory tagging database, by: i) for each transaction in the fulfillment transaction data which is of the new web order or the new call-center order transaction type and is a new transaction for the at least one master records data, creating a corresponding master record having: 1) a unique master transaction tag identifier, 2) a multi-part tag code, where the multi-part tag code including: a) a first part identifying a particular marketer associated with at least one product, at least one service, or both, being subject of such new web order or new call-center order, b) a second part identifying the at least one fulfillment electronic source, and c) a third part identifying a corresponding order identifier from the fulfillment transaction data, 3) a transaction detail part identifying fulfillment transaction details of such new transaction, and 4) a corresponding media agency record identifier, identifying a corresponding airing of a corresponding creative; and ii) for each transaction which is identified in the fulfillment transaction data and is related to an existing master record, a) creating a corresponding sub-master record having: 1) a unique submaster transaction tag identifier, 2) the multi-part tag code, and 3) a transaction detail part identifying corresponding fulfillment transaction details; and b) appending the unique submaster transaction tag identifier to the related existing master record; continuously calculating, in real-time, by a margin value programmed computer module of the at least one specifically programmed server, a current value of a particular airing of a particular creative based on the continuously updating, in real-time, by the tagging data programmed computer module of the at least one specifically programmed server, the at least one master records data table, having a corresponding master record and at least one corresponding submaster record; displaying, the at least one specifically programmed server, at least one graphical user interface, including a plurality of real-time updated look-up graphical items which are programmed to output at least one real-time report based on: i) the continuously updating the at least one master records data table, and ii) the continuously calculating the current value of the particular airing of the particular creative; and where the plurality of real-time updated look-up graphical items are at least: i) a look-up graphical item for selecting at least one country, ii) a look-up graphical item for selecting at least one language, iii) a look-up graphical item for selecting at least one product, at least one service, or both, iv) a look-up graphical item for selecting at least one creative, v) a look-up graphical item for selecting at least one campaign, vi) a look-up graphical item for selecting a length of an airing, vii) a look-up graphical item for selecting at least one offer, viii) a look-up graphical item for selecting at least one broadcast year, ix) a look-up graphical item for selecting at least one broadcast week, x) a look-up graphical item for selecting at least one network, at least one station, or both, xi) a look-up graphical item for selecting a day of week, xii) a look-up graphical item for selecting a time slot, and xiii) a look-up graphical item for selecting a specific date range.

In some embodiments, the at least one predetermined media data database schema, further including: n) a data field for marketer division code identifier, and o) a data filed for marketer department code identifier; and where the plurality of real-time updated look-up graphical items are at least: xiv) a look-up graphical item for selecting at least one product division of at least one marketer, and xv) a look-up graphical item for selecting at least one product department of the at least one marketer.

In some embodiments, the matching, in real-time, records between call-center records in the at least one call center data table and fulfillment records in the at least one fulfillment data table is based, at least in part, on: i) an order date, ii) a 5 digit Zip code, iii) a last name, iv) an order amount, and v) optionally, a street name.

In some embodiments, the at least one web tracking electronic source is selected from the group consisting of: Piwik, Google Analytics, and Omniture. In some embodiments, the matching, in real-time, fulfillment records in the at least one fulfillment data table to other records in the at least one non-transitory tagging database is based, at least in part, on the transaction type. In some embodiments, the current value of the particular airing is a current net margin.

In some embodiments, the verifying, by the media data programmed computer interface module of the at least one specifically programmed server, the media data, including: resolving, in real time, at least one of: overlapping records and duplicate records.

In some embodiments, the phone number is a toll-free phone number. In some embodiments, the media data is media agency data and at least one media data source is an electronic computer system of a media agency.

In some embodiments, the present invention provides a computer-implemented method that includes at least the following steps: electronically and periodically obtaining, over a computer network, by a media data programmed computer interface module of a at least one specifically programmed server, media data from a plurality of computer systems of media data sources, where the media data is associated with a plurality of marketers; where the at least one specifically programmed server is operationally connected at least one non-transitory tagging database; where the at least one non-transitory tagging database is specifically programmed to be dedicated for use by the at least one specifically programmed server; verifying, by the media data programmed computer interface module of the at least one specifically programmed server, the media data in accordance with at least one predetermined media data database schema; populating, by the media data programmed computer interface module of the at least one specifically programmed server, media agency records of airings in at least one media data table of the at least one non-transitory tagging database based, at least in part, on: i) the media data, and ii) the at least one predetermined media data database schema; where the at least one predetermined media data database schema, including: a) at least one data field for marketer code identifier, b) at least one data field for creative code identifier, c) at least one data field for offer code identifier, d) at least one data field for network/station code identifier, e) at least one data field for date code identifier, f) at least one data field for time slot code identifier, g) at least one data field for payment type code identifier, h) at least one data field for phone number code identifier, i) at least one data field for internet address code identifier, j) at least one data field for response metric code identifier, k) at least one data field for country code identifier, 1) at least one data field for language code identifier, and m) at least one data filed for airing length identifier; assigning, in real-time, by the media data programmed computer interface module of the at least one specifically programmed server, at least one media agency record identifier to each media data record in the at least one media data table, where each media data record corresponds to a particular airing of a particular creative; electronically and periodically obtaining, over a computer network, by a web data programmed computer interface module of the at least one specifically programmed server, web tracking transaction data from a computer system of at least one web tracking electronic source; where the web tracking transaction data including: i) web tracking metrics for at least one website associated with at least one offer of at least one creative, and ii) transactional web data for web orders made via the at least one website associated with the at least one offer of at least one creative; verifying, by the web data programmed computer interface module of the at least one specifically programmed server, the web tracking transaction data in accordance with at least one predetermined web tracking transaction database schema; populating, by the web data programmed computer interface module of the at least one specifically programmed server, at least one web data table in the at least one non-transitory tagging database based on the web tracking transaction data; electronically and periodically obtaining, over a computer network, by a call center data programmed computer interface module of the at least one specifically programmed server, call center transaction data from a computer system of at least one call center electronic source; where the call center transaction data including: i) call center metrics for at least one phone number associated with the at least one offer of the at least one creative, and ii) transactional call center data for call-center orders made via the at least one phone number associated with the at least one offer of the at least one creative; verifying, by the call center data programmed computer interface module of the at least one specifically programmed server, the call center transaction data in accordance with at least one predetermined call center transaction database schema; populating, by the call center data programmed computer interface module of the at least one specifically programmed server, at least one call center data table in the at least one non-transitory tagging database based on the call center transaction data; electronically and real-time obtaining, over a computer network, by a fulfillment data programmed computer interface module of the at least one specifically programmed server, from a computer system of at least one fulfillment electronic source, fulfillment transaction data; where the fulfillment transaction data including a plurality of at least thousand fulfillment records associated a plurality of at least thousand fulfillment transactions for the web orders, the call-center orders, or both; where each fulfillment record identifies each fulfillment transaction being associated with a web order or a call-center order; verifying, by the fulfillment data programmed computer interface module of the at least one specifically programmed server, the fulfillment transaction data in accordance with at least one predetermined fulfillment transaction database schema; populating, by the fulfillment data programmed computer interface module of the at least one specifically programmed server, at least one fulfillment data table in the at least one non-transitory tagging database based on the fulfillment transaction data; for each fulfillment transaction, determining, by the fulfillment data programmed computer interface module of the at least one specifically programmed server, a transaction type, where the transaction type is selected from the group of: i) a new web order, ii) a new call-center order, iii) a new parts order for a replacement part, accessory, or both; iv) a repair, v) a return, vi) a cancellation, vii) a backorder, viii) an installment payment, and ix) a partial refund/discount; associating, in real time, by a tagging data programmed computer module of the at least one specifically programmed server, media data records of airings of creatives to fulfillment transaction records in the at least one fulfillment data table, by matching, in real-time, records among at least the following data tables: i) the at least one media data table; ii) the at least one web data table, iii) the at least one call center data table, and iv) the at least one fulfillment data table; for the matched records, continuously updating, in real-time, by the tagging data programmed computer module of the at least one specifically programmed server, at least one master records data table of the at least one non-transitory tagging database, by: i) for each transaction in the fulfillment transaction data which is of the new web order or the new call-center order transaction type and is a new transaction for the at least one master records data, creating a corresponding master record having: 1) a unique master transaction tag identifier, 2) a multi-part tag code, where the multi-part tag code including: a) a first part identifying a particular marketer associated with at least one product, at least one service, or both, being subject of such new web order or new call-center order, b) a second part identifying the at least one fulfillment electronic source, and c) a third part identifying a corresponding order identifier from the fulfillment transaction data, 3) a transaction detail part identifying fulfillment transaction details of such new transaction, and 4) a corresponding media agency record identifier, identifying a corresponding airing of a corresponding creative; and ii) for each transaction which is identified in the fulfillment transaction data and is related to an existing master record, a) creating a corresponding submaster record having: 1) a unique submaster transaction tag identifier, 2) the multi-part tag code, and 3) a transaction detail part identifying corresponding fulfillment transaction details; and b) appending the unique submaster transaction tag identifier to the related existing master record; continuously calculating, in real-time, by a margin value programmed computer module of the at least one specifically programmed server, a current value of a particular airing of a particular creative based on the continuously updating, in real-time, by the tagging data programmed computer module of the at least one specifically programmed server, the at least one master records data table, having a corresponding master record and at least one corresponding submaster record; displaying, the at least one specifically programmed server, at least one graphical user interface, including a plurality of real-time updated look-up graphical items which are programmed to output at least one real-time report based on: i) the continuously updating the at least one master records data table, and ii) the continuously calculating the current value of the particular airing of the particular creative; and where the plurality of real-time updated look-up graphical items are at least: i) a look-up graphical item for selecting at least one country, ii) a look-up graphical item for selecting at least one language, iii) a look-up graphical item for selecting at least one product, at least one service, or both, iv) a look-up graphical item for selecting at least one creative, v) a look-up graphical item for selecting at least one campaign, vi) a look-up graphical item for selecting a length of an airing, vii) a look-up graphical item for selecting at least one offer, viii) a look-up graphical item for selecting at least one broadcast year, ix)

a look-up graphical item for selecting at least one broadcast week, x) a look-up graphical item for selecting at least one network, at least one station, or both, xi) a look-up graphical item for selecting a day of week, xii) a look-up graphical item for selecting a time slot, and xiii) a look-up graphical item for selecting a specific date range.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

FIGS. 3-9 depict certain aspects of the present invention in accordance with some embodiments.

DETAILED DESCRIPTION

Figure 1:
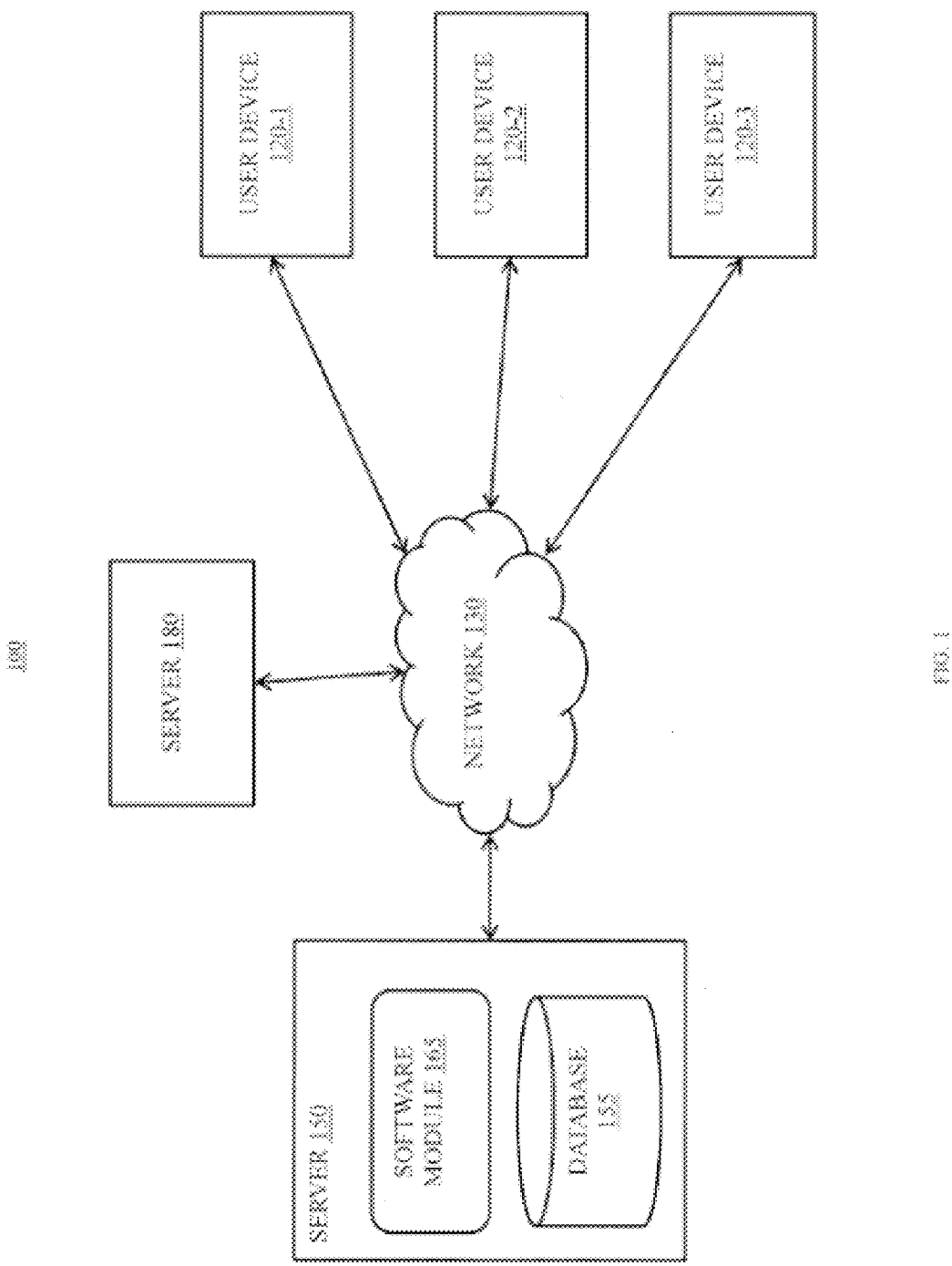
FIG. 1 depicts a block diagram of an exemplary system 100 in accordance with one or more embodiments.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the description, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and dynamically. As used herein, the term "real-time" means that an event/action can occur instantaneously or almost instantaneously in time when another event/action has occurred.

As used herein, the terms "dynamic(ly)" and "automatic(ly)" mean that an event/action that can occur without any human intervention. In some embodiments, the event/action may be in real-time and/or hourly, daily, weekly, monthly, annually, etc.

In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

In some embodiments, the inventive computer systems of the present invention utilize at least one master record database to track and trace back, for example, but not limited to, all changes to an order, pledge, or lead to the original airing which produced that order, pledge, or lead.

As used herein, the term "creative" means a commercial, published element, display, link and/or advertisement that a consumer sees. For example, for TV, the creative can be an Infomercial or Short Form spots, format lengths (:30/:60/:120) could be interchangeable as a singular creative or they could be separate creatives.

As used herein, the term "offer" represents a particular Product/Service configuration or a package of Products/Services, and/or pricing scheme relative to a specific creative, media agency and/or upsell configuration strategy.

As used herein, the term "payment type" covers the pricing scheme in an offer. For example, the payment type can be represented as a one time payment for the product (or service or pledge), or a series of multiple recurring payments at some intervals (e.g., regular intervals) that total the one time payment option.

As used herein, the term "PI program" represents a group of airings that are not paid for based on a negotiated rate but based on a negotiated payout for each phone order generated.

In some embodiments, the inventive computer systems of the present invention utilize at least the following Equation 1:

Net Margin Per Order Generated=Initial Revenue Generated by Airing X in selected time frame−cost of airing−revenue cancelled−revenue returned−Cost of goods for products sold−operating expenses to generate orders+incremental payments for initial order from multi-payment scenarios−discounts. (Equation 1)

As used herein, the term "response (or direct response)" represents consumer response or action to a media event including but not limited to calls, leads, orders, SMS texts, visits, votes, pledges, emails, mail, etc.

As used herein, the term "indirect response" represents indirect consumer response based on profiles resulting from polls, metering, and/or statistical samplings such as Nielsen Impressions, GRPs (Gross Rating Points), HUT Levels, Circulations, census data, etc.

As used herein, the term "source" represents the source, host and/or provider of electronic data regarding media event such as (including but not limited to) TV Stations, Radio Stations, Web Sites, Social Sites, Streaming, Satellite, On Demand, emails, mail, publications, inserts, circulars, etc.

As used herein, the term "campaign" is directed to a set and/or grouping of Creatives targeting a particular marketing effort and/or event. For example, creatives within a campaign can be single or omni-channel.

The discount rate or value of money may be defined as the cost of capital to the marketer or the required return rate of an investment for the marketer. The initial net margin or acquisition cost may be defined as gross revenue less product cost, adjustments to gross revenue and all variable operational costs related to the transaction which produced the customer/order.

In some embodiments, an advertisement, creative, is designed to create a consumer response through such channels as phone, website, postal mail, email, SMS, retail, etc. In some embodiments, the inventive computer systems of the present invention allows to track each response to its trigger creative, allowing for the calculation of its real-time value at a particular time point.

For example, in some embodiments, the inventive computer systems of the present invention are configured to calculate a net margin per order for every airing after allowing for, for example but not limited to, the media cost, product or service cost, adjustments to gross revenue and/or all variable operational costs related to the transaction which produced the order and/or lead.

In some embodiments, a unique airing can be recorded in a database as a record identifying a network or station, day of week and local time. In some embodiments, the inventive computer systems of the present invention are configured to, for the initial order, pledge or lead, create a unique Master Transaction Record in a Tagging database, including, but not limiting to, specific elements of the airing to which at least one order or lead has been attributed (e.g., network/station, date, day, local time), creative, offer ID, and a payment type (e.g., single pay, multi pay).

In some embodiments, the inventive computer systems of the present invention are configured to account for cases when any or all of the elements that define a broadcast airing are missing, by aggregating those airings into one record per day or per week as in a Per Inquiry (PI) program in which case that PI record represents multiple airings on a single Network, and the inventive computer systems of the present invention are configured to calculate value on the Network level, not airing level.

In some embodiments, the inventive computer systems of the present invention are configured to track a life of a particular order or lead (e.g., such as each Master Transaction Record) by using sub-records (e.g., submaster records) for each and all subsequent transactions relating to that order or lead. In some embodiments, the inventive computer systems of the present invention are configured to track event sub-records which can include, but are not limited to, the following:

Cancelled order (by customer or marketer);
Returns (partial or full);
Subsequent payments (in the case of a multi-pay offer or continuity program);
Repair;
Discounts (after initial sale completed);
Backorder; and
Partial Refund/Discount.

For example, in some embodiments, the inventive computer systems of the present invention are configured to continuously recalculate/update the value of an airing, utilizing a specifically programmed margin module which can draw upon various revenue and cost sources including, but not limiting to, media data, call center data, web data and/or variable operational data to calculate the net margin resulting from the immediate or future revenue produced by a particular unique airing.

In some embodiments, variable operational costs can include, but are not limited to, cost of goods, fulfillment, customer service, freight out, credit card authorization fee, returns processing, royalty and management fees.

In some embodiments, as each of subsequent traceable events occurs, for example, the dollar value of each of the sub-records is utilized by the inventive the margin module to recalculate the net margin of the airing. In some embodiments, after an airing's value is determined, the value of a network or station which has run multiple airings can be calculated over any period of time where, a user selects, utilizing a real-time updatable graphical user interface, a time frame reference to be an airing date, not an order date. In some embodiments, the net margin calculation, at the broadcast airing level, forms the foundation for rollups that include, but not limited to, by network or station, daypart, day type, product, offer, creative and any combination of these.

In some embodiments, the inventive computer systems of the present invention are configured to allow a user to access various views of this data, including but not limited to the following:

comparing the value of one or more networks in a given time frame for one or more offers;
comparing the value of one or more networks in a given time frame for one or more creative;
comparing the value of one or more networks in a given time frame for one or more divisions;
comparing the value of one or more networks in a given time frame for one or more departments; and
comparing the value of an offer, creative, division or department across multiple networks.

In some embodiments, the inventive computer systems of the present invention are configured to calculate an acquisition cost of a customer that was generated by an investment in a specific media and then forecasts the cumulative cash flow from that investment (per customer) stated in present value terms for a defined period of time based on historical performance of that media investment.

In some embodiments, the inventive computer systems of the present invention are configured to determine the length of time it took to break even on the investment (assuming it does), taking into account the time value of money. In some embodiments, the inventive computer systems of the present invention are configured to, if the investment does not breakeven, calculate what percent of the initial investment was recovered in a defined period of time.

In some embodiments, the inventive computer systems of the present invention are configured to continuously calculate, in real-time, the value for each media investment that a marketer makes within an advertising campaign for a product, a service, or both.

In some embodiments, the inventive computer systems of the present invention are configured to continuously calculate, in real-time, the value of airings via the Direct Response Television (DRTV), those investments are in individual broadcast airings, such as a paid commercial program of 28:30 in length (infomercial) and/or or a commercial message of between one and five minutes in which a marketer makes an offer to the viewer to purchase a product, a package of products, a service, or both, by calling a toll free number and/or visiting a specific internet address (e.g., URL, URL encoded 3D barcode, etc.). In some embodiments, the inventive computer systems of the present invention are configured to receive data regarding every airing that is tracked, for example but not limited to, in terms of the TV network/station it ran, day, time, calls, and orders and revenue it produced. In some embodiments, the inventive computer systems of the present invention are configured to, after allowing for the product cost, adjustments to gross revenue and all variable operational costs related to the transaction which produced the customer/order, calculate, in rela-time, a net margin per customer/order is for every airing. In some embodiments, this figure tells the marketer the amount invested in acquiring a customer through that specific airing of the commercial.

Illustrative Example in Accordance with Some Embodiments of the Present Invention Each customer that has been attributed to coming onto, a customer fulfillment database as a result of that specific airing is tagged as such; e.g., Mary Smith's purchase of product X has been attributed to the airing of the infomercial for product X on Lifetime on Saturday, Jan. 14, 2013 at 7:00 AM. In some embodiments, the combination of Network/Day/Time (CNBC/Saturday/6:00 AM) is a key identifier of a specific airing. Many other customers' first purchase has been attributed to this same exact airing. Subsequent purchases to the original one that are captured in the database in the month of the original purchase plus the following, for example X months (e.g., 1, 5, 12, 24, etc.) are used to calculate the retention rate and/or the average order. In some embodiments, the revenue from these subsequent purchases is netted out using a profit margin for each product to arrive at a net margin (or contribution). In some embodiments, since these subsequent purchases and associated revenue will be realized at a future point in time, the time value of money needs to be considered in valuing future revenue.

In some embodiments, the present value of future revenue may be calculated using a discount rate for the defined period of time. In some embodiments, the exemplary formula for present value equals future value divided by $(1+d)n$, where d=discount rate and n=number of years, assuming the discount rate is compounded annually. For example, assuming a discount rate of 3%, the 12 month contribution (future value) of $15,000 is divided by 1.03 to arrive at the present value of that contribution, or $14,563.

Continuing with the above example, in order to generate the $15,000 in future value from 200 acquired customers, the company had to invest in acquiring those customers at a cost (or negative contribution) of −$18,000, or $90 per customer. The net present value is equal to the present value of the future revenue less the initial value of the investment. In this example, then, the net present value of the $18,000 investment is equal to $14,563 less $18,000, or −$3,437, or $17.18 per original customer. Continuing further with this example, in the next six months, another $3,600 is generated by the same 200 customers. The present value of that future revenue is equal to $3,600/1.031.5, or $3,444. In total, the present value of the 12 month revenue plus the 6 month revenue equals $18,007, the same as the initial investment. In other words, the net present value of the $18,000 original investment in one specific airing, after 1.5 years, is $7. The $7 is the payback on the investment and the payback period for that investment is said to be 18 months.

In some embodiments, the above analysis is done on each individual airing for a specific product and offer in each broadcast month that the product is being advertised. After 12 months of subsequent purchases by the original group of customers that were attributed to a specific airing, those results are rolled up or summarized at a network/station level, providing the user a comparative view of the long term value of the networks/stations used in the specific product's campaign. The marketer can use this view to supplement his/her evaluation of media buying decisions to either confirm the recommended action or to override a recommended action. For example, if the media buyer recommends selling a specific airing or a group of airings on a network but the analytical tool shows that although this network produces an unacceptable initial contribution per order, its future value is superior to other networks, the user may choose to override that recommendation.

In some embodiments, the inventive computer systems of the present invention are configured to perform airing level valuations based on by daypart, by day type (weekday vs. weekend), by creative, by offer, by product and any combination of these and other variables carried on the master record data table in a tagging database.

In some embodiments, the inventive computer systems of the present invention are configured to, in addition to the mathematical calculations which ascribe a value to each network, apply demographic, psychographic and geographic data to the consumers that responded to the multiple offers run by multiple advertisers on a specific network/station, to build a network customer and/or a responder profile based on actual buyers and responders that responded to an airing on that network rather than on viewer surveys.

In some embodiments, the inventive computer systems of the present invention are configured to determine value based on a negotiated rate for a specific DRTV airing and/or a negotiated payout per order generated, usually by phone only. In some embodiments, the inventive computer systems of the present invention account for a scenario when a third party may handle the media buying on the stations running the creative but usually only reports to the marketer the number of orders generated by that media in a day or week and the payment due for those orders based on the payout. That payment is essentially the media cost. In some embodiments, since most of the time a marketer does not receive specific airing level data for PI media, the aggregated cost, orders and revenue for a period of time form the basis for the valuation of that investment, in a similar fashion to rolling up airings that aired on the same network.

In some cases, the advertiser that uses direct mail to acquire new customers does so by typically renting targeted mailing lists of direct marketers, publishers and non-profit organizations for the purpose of mailing printed advertising material that is coded to indicate the source of the name being mailed to generate a response. In some embodiments, a response, in the form of a purchase or a lead that may convert to a customer purchase, is tracked to the original mailing list source either directly by the key code printed on the advertising material or by a match back algorithm.

In some embodiments, similar to the DRTV example above, the buying behavior of customers that are acquired through a specific mailing list is tracked over 12-24 months at which point the net present value of those subsequent purchases is combined with the net margin of the initial purchase and then divided by the original number of customers to provide a long term value to the investment in the mailing list.

In some embodiments, the inventive computer systems of the present invention are configured to track the real-time value of airings based on at lest one ad in one of multiple consumer touch points that include, but are not limited to, print advertisements, direct mail, direct response television (DRTV), smartphones and the web, is designed to generate a response by means of such channels that include, but are not limited to, phone, website, postal mail, email, SMS and retail which is tracked to its trigger source thereby allowing for the calculation of a near term value to the investment in that source, at different levels of granularity, where customers originally generated at the most granular level of a source are tracked in terms of their subsequent transactions, revenue and/or net margin generation for X number of months after the month of the original transaction at which point the present value of the subsequent margin dollars per original customer is added to the initial investment per original customer (called the net present value) to arrive at the near term value of any level of the source, from the highest summarized source level to the most granular (assuming statistically significant results at the most granular level) and, if the net present value is greater than zero, a discounted payback period is calculated for the investment.

In some embodiments, the inventive computer systems of the present invention are configured to append demographic, psychographic and geographic variables to the master records of customers who responded to the advertisements of multiple advertisers, a responder and buyer profile is built for each media source used based on actual buyers that responded to a specific form of advertisement while controlling for variables that include, but are not limited to, changes in source content such as programming and man-made or natural catastrophic events that may affect consumers' consumption of media.

In some embodiments, the net margin may be equal to gross revenue of each subsequent purchase multiplied by a profit margin percent for the product purchased less all future contact costs including, but not limited to, email blasts, retargeting, direct mail, SMS texting. In some embodiments, the profit margin percent may be equal to the gross revenue less product cost, adjustments to gross revenue and all variable operational costs related to the transaction which produced the order divided by the gross revenue. In some embodiments, the inventive computer systems of the present invention are configured to account for adjustments to gross revenue may include, but are not limited to, cancelled orders and/or returned merchandise.

In some embodiments, variable operational costs may include, but are not limited to, fulfillment, customer service, freight out, credit card authorization fee, returns processing, telemarketing fees, royalty and/or management fees.

In some embodiments, the inventive computer systems of the present invention are configured to track the value of airing for a predetermined time period (e.g., x number of months, such as a minimum of 12 months but no maximum number of months). In some embodiments, the inventive computer systems of the present invention are configured to discount the present value for the value of money of future net margin. In some embodiments, the initial investment may be equal to the net margin of the initial transaction.

In some embodiments, the discounted payback period may be the number of months it takes to reach the point where the future value of each subsequent month's (after initial transaction) gross profit is discounted until the cumulative monthly discounted gross profit exceeds or equals the initial gross profit.

In some embodiments, the inventive computer systems of the present invention are configured to, in the DRTV touch point, calculate the long term value of an investment in a broadcast airing which represents marketing a specific product/service through a specific offer by use of a specific creative commercial of specific length is calculated in terms of the following metrics: 1) the net present value of the current cash outlay plus the expected cash flow in the future per customer attributed to that airing; and 2) where the net present value is positive, the discounted payback period of the investment accounting for the time value of money whereby, in the case of the first metric, in the month following the original airing, the subsequent net margin (arising from subsequent purchases) from the customers attributed to that airing is accumulated for an extended period of time at which point it is discounted for the value of money to arrive at a present value of the gross profit which is combined with the initial net margin to yield the net present value of that airing which is then divided by the number of original customers attributed to that airing and, in the case of the second metric, the future value of each subsequent month's gross profit is discounted until the cumulative monthly discounted gross profit exceeds or equals the initial gross profit at which time the number of months taken to reach that point equals the discounted payback period.

In some embodiments, the broadcast airing level calculation may form the foundation for rollups that include, but not limited to, by network or station, daypart, day type, product, offer, creative, campaign and any combination of these. In some embodiments, the inventive computer systems of the present invention are configured to receive media data for the broadcast airing that may refer to a unique identifier that combines three elements: network/station, day and time.

In some embodiments, when any or all of the elements that define a broadcast airing are missing, those airings may be aggregated by a third party into one record per day or per week as in a Per Inquiry (PI) program in which case that PI record is treated as a Network and the analysis in claim 1 is performed on the investment in the PI program. In some embodiments, the inventive computer systems of the present invention are configured to account for adjustments to gross revenue which may include, but are not limited to, cancelled orders and returned merchandise.

In some embodiments, the inventive computer systems of the present invention are configured to account for variable operational costs which may include, but are not limited to, fulfillment, customer service, freight out, credit card authorization fee, returns processing, telemarketing fees, royalty and management fees.

In some embodiments, a subsequent net margin at particular time pint may be equal to gross revenue of each subsequent purchase multiplied by a profit margin percent for the product purchased less all remarketing costs including, but not limited to, email blasts, retargeting, direct mail. In some embodiments, the profit margin percent may be equal to the gross revenue less product cost, adjustments to gross revenue and/or all variable operational costs related to the transaction which produced the order divided by the gross revenue.

In some embodiments, the inventive computer systems of the present invention are configured to the subsequent purchases may sometimes not include purchases of another "main offer" product featured in the same marketer's other creative in the case of a DRTV marketer that is selling multiple products through different creatives in the same time frame.

In some embodiments, the inventive computer systems of the present invention are configured to account, in the Direct Mail touch point, a current real-time value of an investment in a targeted rented mailing list or space in a direct marketer's outgoing package used to deliver printed advertising material to prospective customers based on, but not limited by, the following metrics: 1) the net present value of the current cash outlay plus the expected cash flow in the future per customer attributed to that mailing list; and 2) where the net present value is positive, the discounted payback period of the investment accounting for the time value of money whereby, in the case of the first metric, the subsequent net margin (arising from subsequent purchases after the initial one) from the customers attributed to that mailing list is accumulated for an extended period of time at which point it is discounted for the value of money to arrive at a present value of the net margin which is combined with the initial net margin to yield the net present value of that mailing list which is then divided by the number of original customers attributed to that mailing list and, in the case of the second metric, the future value of each subsequent month's net margin is discounted until the cumulative monthly discounted net margin exceeds or equals the initial net margin at which time the number of months taken to reach that point equals the discounted payback period.

In some embodiments, printed advertising material may include, but is not limited to, catalogs of various dimensions and page count, postcards, tri-folds, bi-folds, direct mail coupons and package inserts which all but the last one are delivered to a consumer or business via postal mail while package inserts travel in merchandise package shipped by direct marketers.

In some embodiments, the discount rate or value of money may be defined as the cost of capital to the marketer or the required return rate of an investment for the marketer.

In some embodiments, the initial gross profit or acquisition cost may be defined as gross revenue less product cost, adjustments to gross revenue and all variable operational costs related to the transaction which produced the customer/order.

In some embodiments, adjustments to gross revenue may include, but are not limited to, cancelled orders and returned merchandise.

In some embodiments, the inventive computer systems of the present invention are configured to continuously calculate the real-time net margin as being equal to gross revenue of each subsequent purchase multiplied by a profit margin percent for the product purchased less all remarketing costs including, but not limited to, email blasts, retargeting, direct mail.

In addition, by appending demographic, psychographic and geographic variables to the consumers that responded to the advertisements of multiple advertisers, a responder and buyer profile is built for each media source used based on actual buyers that responded to a specific form of advertisement while controlling for variables that include, but are not limited to, changes in source content such as programming and manmade or natural catastrophic events that may affect consumers' consumption of media.

In some embodiments, the present invention is directed to database driven computer systems providing real-time updatable graphical user interfaces to track real-time value of airings. In some embodiments, the instant invention provides for a computer system, including: at least one specifically programmed server; at least one non-transitory tagging database accessible by the at least one specifically programmed server, where the at least one non-transitory tagging database is specifically programmed to be dedicated for use by the at least one specifically programmed server; where the at least one specifically programmed server comprises a plurality of modules configured to perform at least the following operations: electronically and periodically obtaining, over a computer network, by a media data programmed computer interface module of the at least one specifically programmed server, media data from a plurality of computer systems of media data sources, where the media data is associated with a plurality of marketers; verifying, by the media data programmed computer interface module of the at least one specifically programmed server, the media data in accordance with at least one predetermined media data database schema; populating, by the media data programmed computer interface module of the at least one specifically programmed server, media agency records of airings in at least one media data table of the at least one non-transitory tagging database based, at least in part, on: i) the media data, and ii) the at least one predetermined media data database schema; where the at least one predetermined media data database schema, including: a) at least one data field for marketer code identifier, b) at least one data field for creative code identifier, c) at least one data field for offer code identifier, d) at least one data field for network/station code identifier, e) at least one data field for date code identifier, f) at least one data field for time slot code identifier, g) at least one data field for payment type code identifier, h) at least one data field for phone number code identifier, i) at least one data field for internet address code identifier, j) at least one data field for response metric code identifier, k) at least one data field for country code identifier, l) at least one data field for language code identifier, and m) at least one data filed for airing length identifier; assigning, in real-time, by the media data programmed computer interface module of the at least one specifically programmed server, at least one media agency record identifier to each media data record in the at least one media data table, where each media data record corresponds to a particular airing of a particular creative; electronically and periodically obtaining, over a computer network, by a web data programmed computer interface module of the at least one specifically programmed server, web tracking transaction data from a computer system of at least one web tracking electronic source; where the web tracking transaction data including: i) web tracking metrics for at least one website associated with at least one offer of at least one creative, and ii) transactional web data for web orders made via the at least one website associated with the at least one offer of at least one creative; verifying, by the web data programmed computer interface module of the at least one specifically programmed server, the web tracking transaction data in accordance with at least one predetermined web tracking transaction database schema; populating, by the web data programmed computer interface module of the at least one specifically programmed server, at least one web data table in the at least one non-transitory tagging database based on the web tracking transaction data; electronically and periodically obtaining, over a computer network, by a call center data programmed computer interface module of the at least one specifically programmed server, call center transaction data from a computer system of at least one call center electronic source; where the call center transaction data including: i) call center metrics for at least one phone number associated with the at least one offer of the at least one creative, and ii) transactional call center data for call-center orders made via the at least one phone number associated with the at least one offer of the at least one creative; verifying, by the call center data programmed computer interface module of the at least one specifically programmed server, the call center transaction data in accordance with at least one predetermined call center transaction database schema; populating, by the call center data programmed computer interface module of the at least one specifically programmed server, at least one call center data table in the at least one non-transitory tagging database based on the call center transaction data; electronically and real-time obtaining, over a computer network, by a fulfillment data programmed computer interface module of the at least one specifically programmed server, from a computer system of at least one fulfillment electronic source, fulfillment transaction data; where the fulfillment transaction data including a plurality of at least thousand fulfillment records associated a plurality of at least thousand fulfillment transactions for the web orders, the call-center orders, or both; where each fulfillment record identifies each fulfillment transaction being associated with a web order or a call-center order; verifying, by the fulfillment data programmed computer interface module of the at least one specifically programmed server, the fulfillment transaction data in accordance with at least one predetermined fulfillment transaction database schema; populating, by the fulfillment data programmed computer interface module of the at least one specifically programmed server, at least one fulfillment data table in the at least one non-transitory tagging database based on the fulfillment transaction data; for each fulfillment transaction, determining, by the fulfillment data programmed computer interface module of the at least one specifically programmed server, a transaction type, where the transaction type is selected from the group of: i) a new web order, ii) a new call-center order, iii) a new parts order for a replacement part, accessory, or both; iv) a repair, v) a return, vi) a cancellation, vii) a backorder, viii) an installment payment, and ix) a partial refund/discount; associating, in real time, by a tagging data programmed computer module of the at least one specifically programmed server, media data records of airings of creatives to fulfillment transaction records in the at least one fulfillment data table, by matching, in real-time, records among at least the following data tables: i) the at least one media data table; ii) the at least one web data table, iii) the at least one call center data table, and iv) the at least one fulfillment data table; for the matched records, continuously updating, in real-time, by the tagging data programmed computer module of the at least one specifically programmed server, at least one master records data table of the at least one non-transitory tagging database, by: i) for each transaction in the fulfillment transaction data which is of the new web order or the new call-center order transaction type and is a new transaction for the at least one master records data, creating a corresponding master record having: 1) a unique master transaction tag identifier, 2) a multi-part tag code, where the multi-part tag code including: a) a first part identifying a particular marketer associated with at least one product, at least one service, or both, being subject of such new web order or new call-center order, b) a second part identifying the at least one fulfillment electronic source, and c) a third part identifying a corresponding order identifier from the fulfillment transaction data, 3) a transaction detail part identifying fulfillment transaction details of such new transaction, and 4) a corresponding media agency record identifier, identifying a corresponding airing of a corresponding creative; and ii) for each transaction which is identified in the fulfillment transaction data and is related to an existing master record, a) creating a corresponding sub-master record having: 1) a unique submaster transaction tag identifier, 2) the multi-part tag code, and 3) a transaction detail part identifying corresponding fulfillment transaction details; and b) appending the unique submaster transaction tag identifier to the related existing master record; continuously calculating, in real-time, by a margin value programmed computer module of the at least one specifically programmed server, a current value of a particular airing of a particular creative based on the continuously updating, in real-time, by the tagging data programmed computer module of the at least one specifically programmed server, the at least one master records data table, having a corresponding master record and at least one corresponding submaster record; displaying, the at least one specifically programmed server, at least one graphical user interface, including a plurality of real-time updated look-up graphical items which are programmed to output at least one real-time report based on: i) the continuously updating the at least one master records data table, and ii) the continuously calculating the current value of the particular airing of the particular creative; and where the plurality of real-time updated look-up graphical items are at least: i) a look-up graphical item for selecting at least one country, ii) a look-up graphical item for selecting at least one language, iii) a look-up graphical item for selecting at least one product, at least one service, or both, iv) a look-up graphical item for selecting at least one creative, v) a look-up graphical item for selecting at least one campaign, vi) a look-up graphical item for selecting a length of an airing, vii) a look-up graphical item for selecting at least one offer, viii) a look-up graphical item for selecting at least one broadcast year, ix) a look-up graphical item for selecting at least one broadcast week, x) a look-up graphical item for selecting at least one network, at least one station, or both, xi) a look-up graphical item for selecting a day of week, xii) a look-up graphical item for selecting a time slot, and xiii) a look-up graphical item for selecting a specific date range.

In some embodiments, the at least one predetermined media data database schema, further including: n) a data field for marketer division code identifier, and o) a data filed for marketer department code identifier; and where the plurality of real-time updated look-up graphical items are at least: xiv) a look-up graphical item for selecting at least one product division of at least one marketer, and xv) a look-up graphical item for selecting at least one product department of the at least one marketer.

In some embodiments, the matching, in real-time, records between call-center records in the at least one call center data table and fulfillment records in the at least one fulfillment data table is based, at least in part, on: i) an order date, ii) a 5 digit Zip code, iii) a last name, iv) an order amount, and v) optionally, a street name.

In some embodiments, the at least one web tracking electronic source can be Piwik, Google Analytics, Omniture, and/or any other similar web tracking electronic source. In some embodiments, the matching, in real-time, fulfillment records in the at least one fulfillment data table to other records in the at least one non-transitory tagging database is based, at least in part, on the transaction type. In some embodiments, the current value of the particular airing is a current net margin.

In some embodiments, the verifying, by the media data programmed computer interface module of the at least one specifically programmed server, the media data, including: resolving, in real time, at least one of: overlapping records and duplicate records.

In some embodiments, the phone number is a toll-free phone number. In some embodiments, the present invention provides a computer-implemented method that includes at least the following steps: electronically and periodically obtaining, over a computer network, by a media data programmed computer interface module of a at least one specifically programmed server, media data from a plurality of computer systems of media data sources, where the media data is associated with a plurality of marketers; where the at least one specifically programmed server is operationally connected at least one non-transitory tagging database; where the at least one non-transitory tagging database is specifically programmed to be dedicated for use by the at least one specifically programmed server; verifying, by the media data programmed computer interface module of the at least one specifically programmed server, the media data in accordance with at least one predetermined media data database schema; populating, by the media data programmed computer interface module of the at least one specifically programmed server, media agency records of airings in at least one media data table of the at least one non-transitory tagging database based, at least in part, on: i) the media data, and ii) the at least one predetermined media data database schema; where the at least one predetermined media data database schema, including: a) at least one data field for marketer code identifier, b) at least one data field for creative code identifier, c) at least one data field for offer code identifier, d) at least one data field for network/station code identifier, e) at least one data field for date code identifier, f) at least one data field for time slot code identifier, g) at least one data field for payment type code identifier, h) at least one data field for phone number code identifier, i) at least one data field for internet address code identifier, j) at least one data field for response metric code identifier, k) at least one data field for country code identifier, l) at least one data field for language code identifier, and m) at least one data filed for airing length identifier; assigning, in real-time, by the media data programmed computer interface module of the at least one specifically programmed server, at least one media agency record identifier to each media data record in the at least one media data table, where each media data record corresponds to a particular airing of a particular creative; electronically and periodically obtaining, over a computer network, by a web data programmed computer interface module of the at least one specifically programmed server, web tracking transaction data from a computer system of at least one web tracking electronic source; where the web tracking transaction data including: i) web tracking metrics for at least one website associated with at least one offer of at least one creative, and ii) transactional web data for web orders made via the at least one website associated with the at least one offer of at least one creative; verifying, by the web data programmed computer interface module of the at least one specifically programmed server, the web tracking transaction data in accordance with at least one predetermined web tracking transaction database schema; populating, by the web data programmed computer interface module of the at least one specifically programmed server, at least one web data table in the at least one non-transitory tagging database based on the web tracking transaction data; electronically and periodically obtaining, over a computer network, by a call center data programmed computer interface module of the at least one specifically programmed server, call center transaction data from a computer system of at least one call center electronic source; where the call center transaction data including: i) call center metrics for at least one phone number associated with the at least one offer of the at least one creative, and ii) transactional call center data for call-center orders made via the at least one phone number associated with the at least one offer of the at least one creative; verifying, by the call center data programmed computer interface module of the at least one specifically programmed server, the call center transaction data in accordance with at least one predetermined call center transaction database schema; populating, by the call center data programmed computer interface module of the at least one specifically programmed server, at least one call center data table in the at least one non-transitory tagging database based on the call center transaction data; electronically and real-time obtaining, over a computer network, by a fulfillment data programmed computer interface module of the at least one specifically programmed server, from a computer system of at least one fulfillment electronic source, fulfillment transaction data; where the fulfillment transaction data including a plurality of at least thousand fulfillment records associated a plurality of at least thousand fulfillment transactions for the web orders, the call-center orders, or both; where each fulfillment record identifies each fulfillment transaction being associated with a web order or a call-center order; verifying, by the fulfillment data programmed computer interface module of the at least one specifically programmed server, the fulfillment transaction data in accordance with at least one predetermined fulfillment transaction database schema; populating, by the fulfillment data programmed computer interface module of the at least one specifically programmed server, at least one fulfillment data table in the at least one non-transitory tagging database based on the fulfillment transaction data; for each fulfillment transaction, determining, by the fulfillment data programmed computer interface module of the at least one specifically programmed server, a transaction type, where the transaction type is selected from the group of: i) a new web order, ii) a new call-center order, iii) a new parts order for a replacement part, accessory, or both; iv) a repair, v) a return, vi) a cancellation, vii) a backorder, viii) an installment payment, and ix) a partial refund/discount; associating, in real time, by a tagging data programmed computer module of the at least one specifically programmed server, media data records of airings of creatives to fulfillment transaction records in the at least one fulfillment data table, by matching, in real-time, records among at least the following data tables: i) the at least one media data table; ii) the at least one web data table, iii) the at least one call center data table, and iv) the at least one fulfillment data table; for the matched records, continuously updating, in real-time, by the tagging data programmed computer module of the at least one specifically programmed server, at least one master records data table of the at least one non-transitory tagging database, by: i) for each transaction in the fulfillment transaction data which is of the new web order or the new call-center order transaction type and is a new transaction for the at least one master records data, creating a corresponding master record having: 1) a unique master transaction tag identifier, 2) a multi-part tag code, where the multi-part tag code including: a) a first part identifying a particular marketer associated with at least one product, at least one service, or both, being subject of such new web order or new call-center order, b) a second part identifying the at least one fulfillment electronic source, and c) a third part identifying a corresponding order identifier from the fulfillment transaction data, 3) a transaction detail part identifying fulfillment transaction details of such new transaction, and 4) a corresponding media agency record identifier, identifying a corresponding airing of a corresponding creative; and ii) for each transaction which is identified in the fulfillment transaction data and is related to an existing master record, a) creating a corresponding sub-master record having: 1) a unique submaster transaction tag identifier, 2) the multi-part tag code, and 3) a transaction detail part identifying corresponding fulfillment transaction details; and b) appending the unique submaster transaction tag identifier to the related existing master record; continuously calculating, in real-time, by a margin value programmed computer module of the at least one specifically programmed server, a current value of a particular airing of a particular creative based on the continuously updating, in real-time, by the tagging data programmed computer module of the at least one specifically programmed server, the at least one master records data table, having a corresponding master record and at least one corresponding submaster record; displaying, the at least one specifically programmed server, at least one graphical user interface, including a plurality of real-time updated look-up graphical items which are programmed to output at least one real-time report based on: i) the continuously updating the at least one master records data table, and ii) the continuously calculating the current value of the particular airing of the particular creative; and where the plurality of real-time updated look-up graphical items are at least: i) a look-up graphical item for selecting at least one country, ii) a look-up graphical item for selecting at least one language, iii) a look-up graphical item for selecting at least one product, at least one service, or both, iv) a look-up graphical item for selecting at least one creative, v) a look-up graphical item for selecting at least one campaign, vi) a look-up graphical item for selecting a length of an airing (for example, defined in seconds, minutes, hours, etc.); vii) a look-up graphical item for selecting at least one offer, viii) a look-up graphical item for selecting at least one broadcast year, ix) a look-up graphical item for selecting at least one broadcast week, x) a look-up graphical item for selecting at least one network, at least one station, or both, xi) a look-up graphical item for selecting a day of week, xii) a look-up graphical item for selecting a time slot, and xiii) a look-up graphical item for selecting a specific date range.

In some embodiments, the media data is media agency data and at least one media data source is an electronic computer system of a media agency. In some embodiments, the media agency can be an advertising agency, a network, a station, or any other suitable entity that places, distributes, and/or publishes creatives.

In some embodiments, the inventive computer systems of the present invention are configured to receive, from various media data sources, contracted by or on behalf of a marketer (e.g., producer of products or provider of services), media data regarding airings and media response data identifying response metrics (e.g., a number of orders, calls, etc.). In some embodiments, the inventive computer systems of the present invention are configured to verify the incoming data and to populate a media response table in a non-transitory database. In some embodiments, the inventive computer systems of the present invention are, similarly, configured to receive and process web data regarding orders placed on the internet, call center data regarding orders placed with call center(s), and fulfillment data regarding activity occurred with placed orders (e.g., shipped, cancelled, returned, discount, subsequent purchase related to the initial order, etc.).

In some embodiments, the inventive systems of present invention are configured to process records associated with at least 1 to 1,000 marketers. In some embodiments, the inventive systems of present invention are configured to process records associated with at least 1,000 to 10,000 marketers. In some embodiments, the inventive systems of present invention are configured to process records associated with at least 10,000 to 1,000,000 marketers. In some embodiments, the inventive systems of present invention are configured to process records associated with at least 1,000,000 to 1,000,000,000 marketers. In some embodiments, the inventive systems of present invention are configured to process records associated with at least 1,000,000,000 marketers.

In some embodiments, the inventive systems of present invention are configured to process records associated with at least 1 to 1,000 creatives. In some embodiments, the inventive systems of present invention are configured to process records associated with at least 1,000 to 10,000 creatives. In some embodiments, the inventive systems of present invention are configured to process records associated with at least 10,000 to 1,000,000 creatives. In some embodiments, the inventive systems of present invention are configured to process records associated with at least 1,000,000 to 1,000,000,000 creatives. In some embodiments, the inventive systems of present invention are configured to process records associated with at least 1,000,000,000 creatives.

In some embodiments, the inventive systems of present invention are configured to process records associated with at least 1 to 1,000 media sources. In some embodiments, the inventive systems of present invention are configured to process records associated with at least 1,000 to 10,000 media sources. In some embodiments, the inventive systems of present invention are configured to process records associated with at least 10,000 to 1,000,000 media sources. In some embodiments, the inventive systems of present invention are configured to process records associated with at least 1,000,000 media sources.

In some embodiments, the inventive systems of present invention are configured to tag records with the multi-part tag, consisting of three to 5 parts, where each part is user-defined format, and, in real time, populated by the inventive systems of present invention. In some embodiments, the inventive systems of present invention are configured to tag records with the multi-part tag, consisting of three to ten parts, where each part is user-defined format, and, in real time, populated by the inventive systems of present invention. In some embodiments, the inventive systems of present invention are configured to tag records with the multi-part tag, consisting of at least three parts, where each part is user-defined format, and, in real time, populated by the inventive systems of present invention.

Exemplary Fields of Media Response Schema for a Media Response Table

MediaDataProviderID INTEGER
CountryID INTEGER
MarketerID INTEGER
AgencyID INTEGER
MediaUniqueID VARCHAR (50)
BuyTypeID INTEGER
MediaRecordTypeID INTEGER
MediaRecordDateID INTEGER
MediaRecordDate DATE
MediaRecordTime TIME
MarketID INTEGER
StationID INTEGER
TFN (Toll Free Number) VARCHAR (16)
WebURL VARCHAR (50)
RotationDays VARCHAR (50)
Rotation_WKDAY1 VARCHAR (10)
Rotation_WKDAY2 VARCHAR (10)
Rotation_WKDAY3 VARCHAR (10)
Rotation_WKDAY4 VARCHAR (10)
Rotation_WKDAY5 VARCHAR (10)
Rotation_WKDAY6 VARCHAR (10)
Rotation_WKDAY7 VARCHAR (10)
RotationDate_WKDAY1 DATE
RotationDate_WKDAY2 DATE
RotationDate_WKDAY3 DATE
RotationDate_WKDAY4 DATE
RotationDate_WKDAY5 DATE
RotationDate_WKDAY6 DATE
RotationDate_WKDAY7 DATE
RotationTime VARCHAR (50)
RotationStartTime TIME
RotationEndTime TIME
StandardAiringDateID INTEGER
StandardAiringDay VARCHAR (9)
StandardAiringTime TIME
LocalAiringDateID INTEGER
LocalAiringDate DATE
LocalAiringTime TIME
GrossMediaCost MONEY
NetMediaCost MONEY
AgencyDiscount DECIMAL (7,2)
CallCenterID INTEGER OfferID INTEGER
Offer VARCHAR (1000)
CreativeID INTEGER
Creative VARCHAR (1000)
Allowable VARCHAR (50)
LeadInShow VARCHAR (50)
AffiliateID INTEGER
Affiliate VARCHAR (50)
ISCICode VARCHAR (25)
RotationBooked INTEGER
AiringAffidavitNumber VARCHAR (50)
HouseholdCirculationImprint DECIMAL (18,6)
NielsenDemoImpressions DECIMAL (18,6)
Age VARCHAR (50)
Gender VARCHAR (2)
NielsenGrossRatingPoints DECIMAL (18,3)
NielsenDemoRatingPoints DECIMAL (18,3)
TotalCalls INTEGER
TotalLeads INTEGER
TotalOrders INTEGER
PackageIdentifier VARCHAR (50)
GrossRevenue MONEY
MediaWKStartDate DATE
MediaRecordCategoryID INTEGER
DivisionID INTEGER
DepartmentID INTEGER
CampaignID INTEGER
CreativeVariantID INTEGER
CreativeTypeID INTEGER
OfferVariantID INTEGER
StationVariantID INTEGER
StationExceptionID INTEGER
MediaLengthID INTEGER
MediaLengthVariantID INTEGER
DayPartID INTEGER
DayPartVariantID INTEGER
CurrencyID INTEGER
LanguageID INTEGER
MediaBudgetID INTEGER
RotationDateID INTEGER
RotationDate DATE
RotationTime TIME
NoOfCCPayments TINYINT
TargetCPO MONEY
TargetCPC MONEY
TargetMER FLOAT (53)
CPO MONEY
CPC MONEY
MER FLOAT (53)
MediaWeekStartDate DATETIME
MediaWeekEndDate DATETIME
MediaMonthStartDate DATETIME
MediaMonthEndDate DATETIME
WeeklyCPOWeightageValue NUMERIC (18,4)
WeeklyMERWeightageValue NUMERIC (18,4)
IsLF BIT
IsSF BIT
IsPaid BIT
IsSourceNoMatch BIT
IsMediaLengthNoMatch BIT
IsOfferNotMatch BIT
IsCreativeNotMatch BIT
IsDatallotMatch BIT
IsRoTimeViolation BIT
IsRoDayViolation BIT
IsRoBookedViolation BIT
DataErrorFixBy INTEGER
DataErrorFixDate DATETIME
DataLoadDate DATETIME
DataUpdateDate DATETIME
IsDuplicate BIT
DuplicateDate DATETIME
IsOverlap BIT
OverlapDate DATETIME
IsDelete BIT
IsFuture BIT
IsError BIT
IsActive BIT
IsLastRun BIT
DuplicateFiles VARCHAR (1000)
OverlapFiles VARCHAR (1000)
SourceFileName VARCHAR (50)
DNMRemarks VARCHAR (2000)
SourceStationName VARCHAR (100)
RecordStatus VARCHAR (20)
ChangedField VARCHAR (100)
TargetCPL MONEY
TargetROI MONEY
TargetSubsidy MONEY
CPL MONEY
CPLIndex NUMERIC (18,4)
CallCenterOrderID INTEGER Exemplary Fields of Call Center Schema for Call Center Table CallCenterOrderID INTEGER
CallCenterDPID INTEGER
CallCenterMasterID INTEGER
CallCenterUnitID INTEGER
MarketerID INTEGER
AgencyID INTEGER
AgentTypeID INTEGER
DispositionID INTEGER
StationID INTEGER
StationVariantID INTEGER
StationExceptionID INTEGER
MarketID INTEGER
TimeZoneID INTEGER
DivisionID INTEGER
DepartmentID INTEGER
CampaignID INTEGER
CreativeID INTEGER
OfferID INTEGER
OfferVariantID INTEGER
CustomerPhone BIGINT
CustomerEmail VARCHAR (100)
Age INTEGER
GenderID INTEGER
DialedNumber BIGINT
PaymentMethodID INTEGER
NumberOfPaymentCode VARCHAR (10)
BillingAddressID INTEGER
ShippingAddressID INTEGER
CallStartDateID INTEGER
CallStartDateTime DATETIME2
CallStartDate DATE
CallStartTime TIME
ADJCallStartDateID INTEGER
ADJCallStartDateTime DATETIME2
ADJCallStartDate DATE
ADJCallStartTime TIME
CallEndDateID INTEGER
CallEndDateTime DATETIME2

CallEndDate DATE
CallEndTime TIME
ADJCallEndDateID INTEGER
ADJCallEndDateTime DATETIME2
ADJCallEndDate DATE
ADJCallEndTime TIME
AgentCallLength TIME
TotalCallLength TIME
OrderNumber VARCHAR (50)
OrderItemCount INTEGER
TotalItemPrice NUMERIC (18,6)
TotalOrderDiscount NUMERIC (18,6)
TotalOrderShippingPrice NUMERIC (18,6)
TotalOrderTax NUMERIC (18,6)
TotalOrderAmount NUMERIC (18,6)
IUD CHAR (1)
UpdatedDate DATETIME2
SourceFileName VARCHAR (50)
SourcedKey VARCHAR (255)
isSourced BIT
SourcedKeyLF VARCHAR (255)
isSourcedLF BIT
SourcedKeySF VARCHAR (255)
isSourcedSF BIT
CreativeVariantID INTEGER
CurrencyID INTEGER Exemplary Fields of Web Attribution Schema for Web Order Data Table WebOrderID INTEGER
WebDPID INTEGER
* WebMasterID INTEGER
WebUnitID INTEGER
MarketerID INTEGER
DispositionID INTEGER
StationID INTEGER
MarketID INTEGER
TimeZoneID INTEGER
DivisionID INTEGER
DepartmentID INTEGER
CampaignID INTEGER
CreativeID INTEGER
OfferID INTEGER
OfferWebID INTEGER
CustomerPhoneNo INTEGER
CustomerEmail VARCHAR (100)
Age INTEGER
GenderID INTEGER
DialedNumber VARCHAR (50)
LandingPageURLID INTEGER
LandingPageURL VARCHAR (3000)
ReferralURL VARCHAR (3000)
ReferralTypeID INTEGER
Browser VARCHAR (50)
DeviceName VARCHAR (50)
UserCountry VARCHAR (50)
UserState VARCHAR (50)
UserCity VARCHAR (50)
NumberOfPagesViewed INTEGER
DurationOnWebSite TIME
BounceRate INTEGER
PaymentMethodID INTEGER
BillingAddressID INTEGER
ShippingAddressID INTEGER
LandingDate DATE
LandingTime TIME CartStatus VARCHAR (10)
MaxNumberOfItemCart INTEGER
CheckOutItemCart INTEGER
NumberPastUniqueVisit INTEGER
OrderDate DATE
OrderTime TIME
ADJOrderDate DATE
ADJOrderTime TIME
OrderNumber VARCHAR (50)
OrderItemCount INTEGER
TotalItemPrice NUMERIC (18,6)
TotalOrderDiscount NUMERIC (18,6)
TotalOrderShipingPrice NUMERIC (18,6)
TotalOrderTax NUMERIC (18,6)
TotalOrderAmount NUMERIC (18,6)
CurrencyID INTEGER
UserIPAddress VARCHAR (50)
CustomString VARCHAR (3000)
WebAnalyticProvider VARCHAR (50)
IUD CHAR (1)
IsLastRun BIT
DataMigratedBy INTEGER
DataMigratedDate DATETIME2
UpdatedBy INTEGER
UpdatedDate DATETIME2
SourceFileName VARCHAR (50)
AttributionKey VARCHAR (255)
IsAttributed BIT
OrderDateTime VARCHAR (75)
ADJOrderDateTime DATETIME
AttributionKeyLF VARCHAR (255)
isAttributedLF BIT
AttributionKeySF VARCHAR (255)
isAttributedSF BIT Exemplary Fields of Fulfillment Transaction Schema for Fulfillment Data Table FulfillmentOrderStagingID INTEGER
* stgFulfillmentOrderID INTEGER
FulfillmentDataProviderCode VARCHAR (50)
FulfillmentDPID INTEGER
MarketerCode VARCHAR (50)
MarketerID INTEGER
FulfillmentUnitCode VARCHAR (50)
FulfillmentUnitID INTEGER
FulfillmentMasterCode VARCHAR (50)
FulfillmentMasterID INTEGER
RecordDate DATE
RecordTime TIME
CustomerNumber VARCHAR (50)
FulfillmentOrderNumber VARCHAR (50)
SourceOrderNumber VARCHAR (50)
OrderDate DATE
OfferID INTEGER
OfferCode VARCHAR (1000)
PaymentPlanCode VARCHAR (50)
OrderHeaderCode VARCHAR (3)
OrderSource VARCHAR (20)
StationID INTEGER
StationCode VARCHAR (50)
DialedNumber VARCHAR (50)
WebURL VARCHAR (2000)
StoreCode VARCHAR (50)
OrginalOrderNumber VARCHAR (50)
BillingAddressID INTEGER
BillingFirstName VARCHAR (50)

BillingLastName VARCHAR (50)
BillingAddress1 VARCHAR (255)
BillingAddress2 VARCHAR (255)
BillingCity VARCHAR (50)
BillingStateID INTEGER
BillingStateCode VARCHAR (10)
BillingCountryID INTEGER
BillingCountryCode VARCHAR (3)
BillingZIPCodeID INTEGER
BillingZIPCode VARCHAR (10)
BillingPhoneNumber VARCHAR (50)
TotalOrderQuantity INTEGER
TotalOrderAmount DECIMAL (16,6)
TotalShippedQuantity INTEGER
TotalShippedAmount DECIMAL (16,6)
TotalOrderTaxAmount DECIMAL (16,6)
TotalSHAmount DECIMAL (16,6)
TotalOrderDiscountAmount DECIMAL (16,6)
TotalOrderInvoiceAmount DECIMAL (16,6)
ContinuityLevel VARCHAR (50)
ShippingAddress1ID INTEGER
Shipping1FirstName VARCHAR (50)
Shipping1LastName VARCHAR (50)
Shipping1Address1 VARCHAR (255)
Shipping1Address2 VARCHAR (255)
Shipping1City VARCHAR (50)
Shipping1StateID INTEGER
Shipping1StateCode VARCHAR (10)
Shipping1CountryID INTEGER
Shipping1CountryCode VARCHAR (3)
Shipping1ZIPCodeID INTEGER
Shipping1ZIPCode VARCHAR (10)
ShippingAddress2ID INTEGER
Shipping2FirstName VARCHAR (50)
Shipping2LastName VARCHAR (50)
Shipping2Address1 VARCHAR (255)
Shipping2Address2 VARCHAR (255)
Shipping2City VARCHAR (50)
Shipping2StateID INTEGER
Shipping2StateCode VARCHAR (10)
Shipping2CountryID INTEGER
Shipping2CountryCode VARCHAR (3)
Shipping2ZIPCodeID INTEGER
Shipping2ZIPCode VARCHAR (10)
ShippingAddress3ID INTEGER
Shipping3FirstName VARCHAR (50)
Shipping3LastName VARCHAR (50)
Shipping3Address1 VARCHAR (255)
Shipping3Address2 VARCHAR (255)
Shipping3City VARCHAR (50)
Shipping3StateID INTEGER
Shipping3StateCode VARCHAR (10)
Shipping3CountryID INTEGER
Shipping3CountryCode VARCHAR (3)
Shipping3ZIPCodeID INTEGER
Shipping3ZIPCode VARCHAR (10)
ShippingAddress4ID INTEGER
Shipping4FirstName VARCHAR (50)
Shipping4LastName VARCHAR (50)
Shipping4Address1 VARCHAR (255)
Shipping4Address2 VARCHAR (255)
Shipping4City VARCHAR (50)
Shipping4StateID INTEGER
Shipping4StateCode VARCHAR (10)
Shipping4CountryID INTEGER
Shipping4CountryCode VARCHAR (3)
Shipping4ZIPCodeID INTEGER
Shipping4ZIPCode VARCHAR (10)
ShippingAddress5ID INTEGER
Shipping5FirstName VARCHAR (50)
Shipping5LastName VARCHAR (50)
Shipping5Address1 VARCHAR (255)
Shipping5Address2 VARCHAR (255)
Shipping5City VARCHAR (50)
Shipping5StateID INTEGER
Shipping5StateCode VARCHAR (10)
Shipping5CountryID INTEGER
Shipping5CountryCode VARCHAR (3)
Shipping5ZIPCodeID INTEGER
Shipping5ZIPCode VARCHAR (10)
NCOAOldAddress1 VARCHAR (50)
NCOAOldAddress2 VARCHAR (50)
NCOAOldZipCode VARCHAR (10)
NCOAOldCity VARCHAR (50)
NCOAOldState VARCHAR (50)
NCOAOldCountry VARCHAR (10)
SourceFileName VARCHAR (50)
IsOfferNotMatch BIT
IsError BIT
DNMRemarks VARCHAR (50)
DataLoadDate DATETIME
OfferVariantID INTEGER
OfferVariantCode VARCHAR (50)
IsURLNotMatch BIT
IsOrderItemCountNotMatch BIT
IsSKUKitNotMatch BIT
DataLoadBy INTEGER
StationVariantID INTEGER
StationVariantCode VARCHAR (1000)

Exemplary Data flow Among Databases

An exemplary Media Database

In some embodiments, the inventive systems of the present invention combine and validated data for the media agency records from a plurality of media data sources, for example, via ETL (Extract, Transform, Load)-type processes on, for example, a periodical basis (e.g., Daily Transactional File—24 Hrs). In some embodiments, the exemplary media database contains MAR ID (media agency record identifier for a creative), Media ID, and Agency Data.

An Exemplary Call Center Database

In some embodiments, the inventive systems of the present invention combine and validated data for call center order records from a plurality of call centers, for example, via ETL (Extract, Transform, Load)-type processes on, for example, a periodical basis (e.g., Daily Transactional File—24 Hrs). In some embodiments, the call center data is processed in real time to update the master record-related databases (e.g., gross revenue database, net margin database).

An exemplary Web Database (Piwik, Ga., Omniture, etc)

In some embodiments, the inventive systems of the present invention combine and validated data for web order records from a plurality of web tracking sources, for example, via ETL (Extract, Transform, Load)-type processes on, for example, a periodical basis (e.g., Daily Transactional File—24 Hrs). In some embodiments, the web data is processed in real time through an attribution process that matches web records to active creatives' offers based on a field "Item1SKU (Kit Code)" to associate to provide Offer and Product values. For example, in some embodiments, Piwik Order Numbers match the Order Numbers found in Fulfillment Data Feed(s). In some embodiments, the web data is separated between advertised programs and parts/accessories orders.

Fulfillment Data Feed

In some embodiments, fulfillment data feeds are matched to call center data, web data, media data, based on a plurality of fields such as Order ID, Offer ID, Name & Address, and Order Amount. In some embodiments, the fulfillment data is received with a time delay such as 3-5 business days behind the call center and/or web data. In some embodiments, to match the Call Center Database Record to the Fulfillment Data Feed, the inventive systems of the present invention utilize the match logic that can be based on a plurality of the following fields:

Order Date
Zip (e.g., 5 Digits, 9 digits, 11 digits)
Last Name (e.g., first 5 letters)
Order Amount
Street Name (e.g., first 5 vharacters).

In some embodiments, once Call Center Data and fulfillment data are matched, the inventive systems of the instant invention automatically assign tags and create mater records in the tagging database.

In some embodiments, the inventive systems of the instant invention generate exception reports for errors and/r unmatched records, which can be shown as revenue leakage.

Exemplary Tagging Process

Figure 3:
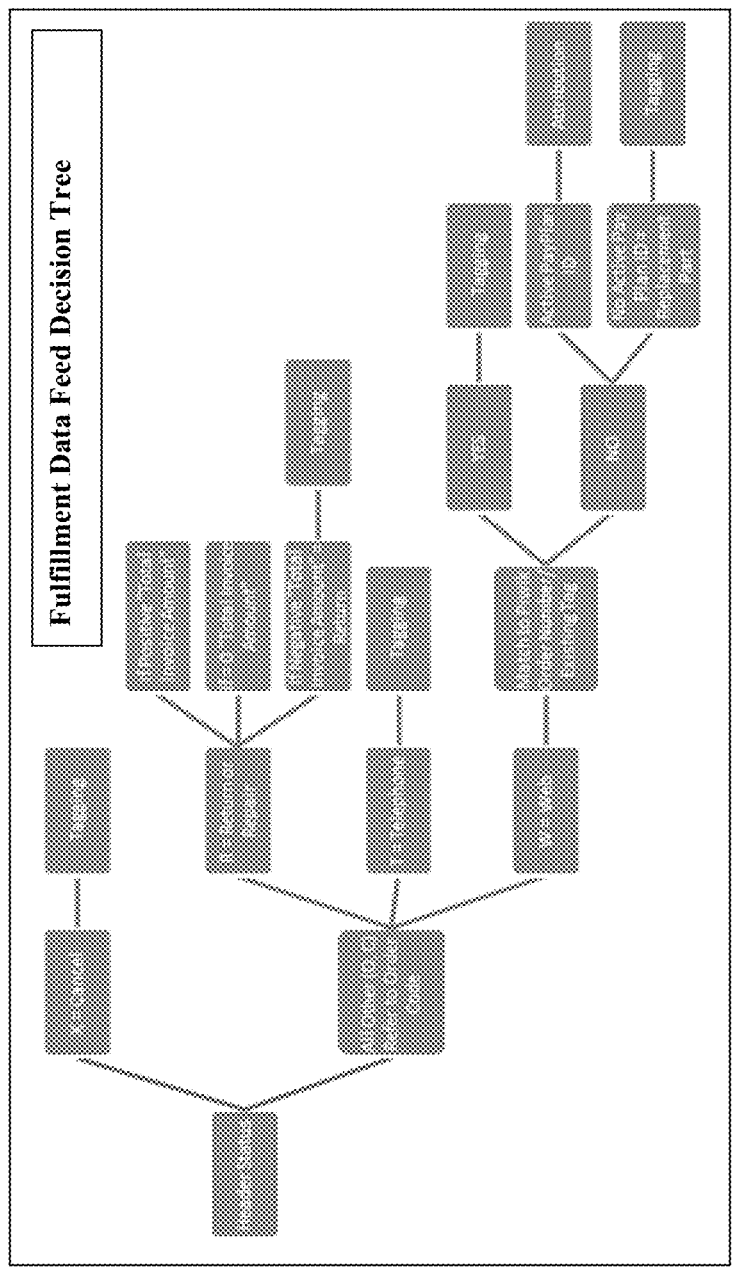

FIG. 3 illustrate an example fulfillment data feed decision/matching logic used by the inventive computer systems if the present invention to match fulfillment data to call center/web data and to tag the identified matching records by creating master tagging records.

For example, in some embodiments, the Tagging process generates an unique code for every transaction and use case based, at least in part, on Order ID and Order Dates.

In some embodiments, each Tag is associated with a "detail" record and a "Master" record. FIG. 4 shows an exemplary multi-part Tag utilized by the inventive systems of the present invention. For example, if an Order Number creates multiple transactions (i.e., original order transaction and subsequent transactions), the first Tag assigned to the first transaction is the Master. In some embodiments, the tagging module can create a second line record/item (due to return, cancel, or multipay scenarios).

An Exemplary Gross Total Database

In some embodiments, the tagging module of the inventive computer systems of the present invention creates an real-time updatable Gross Total Line record for each Individual Tag Master record, which totals all line items for that Order to feed, in real-time, a Margin Module that calculates the net margin. In some embodiments, the Tagged Master records are then rolled up by Offer and Creative fields where all Individual creatives and offers are summarized and can feed exemplary real-time updatable look-up graphical items on a user graphical interface shown in FIG. 5, which are utilized to generate real-time values of airing(s) reports shown in FIGS. 6-9 (e.g., total Orders, Gross $'s, Subtraction of Return $'s, Cancel $'s, etc.). In some embodiments, items with an asterisk in FIG. 5 accept more than one selection. In some embodiments, when there are more than one airing on a station/day/time within the selected broadcast weeks, the revenue and cost figures are summed across those airings and a net margin per airing is calculated at the end. FIG. 6 provides an exemplary real-time report when 1 Network, 1 Offer, 2x+ Airings. FIG. 7 provides an exemplary real-time report when 2x+ Networks, 1 Offer. FIG. 8 provides an exemplary real-time report when 1 Network, 2x+ Offers. FIG. 8 provides an exemplary real-time report when All Networks, 2x+ Offers.

Tables 1-6 illustrate various exemplary tagging scenarios that are utilized by the inventive systems of the present invention to tag matched records in accordance with some embodiments.

TABLE 1

| | Case 1 - New transaction - Transaction does not exist in Tagging database | |
|---|---|---|
| Field | Action | Change |
| Tag | Insert | System generated |
| Order # | Insert | Fulfillment - Source Order Number |
| Order Date | Insert | Fulfillment - Order Date |
| Order Time | Insert | Web Order - OrderDate@web transaction/analytic data Call Center Order - CallStartDate@Call Center data |
| Header Status | Insert | OrderSource@FulfillmentOrder |
| Order Code | Insert | OrderCode@FulfillmentOrder |
| Customer Number | Insert | CustomerNumber@Fulfillment |
| MergedTo Customer Number | | Initially it will be CustomerNumber@Fulfillment. Later on when customer dedupe is in place this will be customer to which this record has been merged |
| Fulfillment Data Provider ID | | |
| Marketer ID | Insert | MarketerID -> FulfillmentOrder |
| Offer ID | Insert | OfferID from Payplan ID - IP generated |
| Payment Plan ID | Insert | Fulfillment - PaymentPlanCode |
| MAR ID (Includes Agency, Network/Station, Day Time) MAR ID would feed LTV by station/network + Actual Breakeven + Marketer ID (taken from Gross Total Database) | | |
| Channel | Insert | Fulfillment - OrderSource |
| Disposition | Insert | |
| Bill-To Telephone Number | Insert | Fulfillment |
| Bill-To Title | Insert | Fulfillment |
| Bill-To First Name | Insert | Fulfillment |
| Bill-To Last Name | Insert | Fulfillment |
| Bill-To Address Line 1 | Insert | Fulfillment |
| Bill-To Address Line 2 | Insert | Fulfillment |
| Bill-To Zip Code | Insert | Fulfillment |
| Bill-To Zip Code 9 | Insert | Fulfillment |
| Bill-To City | Insert | Fulfillment |
| Bill-To State | Insert | Fulfillment |
| Bill-To Country | Insert | Fulfillment |
| Ship-To Title | Insert | Fulfillment |
| Ship-To First Name | Insert | Fulfillment |
| Ship-To Last Name | Insert | Fulfillment |
| Ship-To Address Line 1 | Insert | Fulfillment |
| Ship-To Address Line 2 | Insert | Fulfillment |
| Ship-To Zip Code | Insert | Fulfillment |
| Ship-To Zip Code 9 | Insert | Fulfillment |
| Ship-To City | Insert | Fulfillment |
| Ship-To State | Insert | Fulfillment |
| Ship-To Country | Insert | Fulfillment |
| Total Order Quantity | Insert | Fulfillment |
| Total Order Amount | Insert | Fulfillment |
| Total Shipped Quantity | Insert | Total Shipped Quantity -> Fulfillment |
| Total Shipped Amount | Insert | Total Shipped Amount -> Fulfillment |
| Total Order Tax Amount | Insert | Total Order Tax Amount -> Fulfillment |
| Total Order S&H Amount | Insert | Total Order S&H Amount -> Fulfillment |
| Total Order Discount | Insert | Discount $ -> Fulfillment |

TABLE 1-continued

Case 1 - New transaction - Transaction does not exist in Tagging database

| Field | Action | Change |
|---|---|---|
| Amount | | |
| Total Order Invoice Amount | Insert | Total Order Invoice Amount -> Fulfillment |
| Order Line Number | Insert | Number of total transactions for this order. Starts with 1 for the initial order |
| Source Order Number Item Number | Insert Insert | Source Order Number -> Fulfillment |
| Original Order Number | Insert | Original Order Number -> Fulfillment |
| Order Line Quantity Ordered | Insert | Count of quantity orders-to be populated based on source order |
| Order Line Quantity Shipped | Insert | Count of quantity orders - to be calculated based on actual shipping information |
| Order Line Amount | Insert | $ value of order - to be populated based on actual fulfillment transaction order |
| Order Line Discount Amount | Insert | $ value of discount - to be populated based on actual fulfillment order |
| Order Line Invoice Amount | Insert | $ value of invoice - to be populated based on actual fulfillment order |
| Offer AOV - Planned | Insert | Sourced from Margin Module. If offer is not there e.g for a parts transaction then this is empty |
| Offer Breakeven - Planned | Insert | Sourced from Margin Module. If offer is not there e.g for a parts transaction then this is empty |
| SKU Planned Cost | Insert | Sourced from Margin Module. If offer is not there e.g for a parts transaction then this is empty |

TABLE 2

Case 2 - Existing transaction - Transaction exists in Tagging database

| Field | Action | Existing transaction |
|---|---|---|
| IP Tag | No action | No change |
| Order # | No action | No change |
| Order Date | No action | No change |
| Order Time | No action | No change |
| Header Status | No action | No change |
| Order Code | No action | No change |
| Customer Number | No action | No change |
| Merged To Customer Number | Update | If merged to customer number has changed then the value will be updated. Else it remains the same |
| Fulfillment Data Provider ID | | |
| Marketer ID | No action | No change |
| Offer ID | No action | No change |
| Payment Plan ID | No action | No change |
| MAR ID | | |
| Channel (Values of Phone, Web, Others - W -> Web, T -> Phone, R -> Lookup the original order type, If not matched then "Others") | No action | No change |
| Disposition | | No change |
| Bill-To Telephone Number | No action | No change |
| Bill-To Title | No action | No change |
| Bill-To First Name | No action | No change |
| Bill-To Last Name | No action | No change |
| Bill-To Address Line 1 | No action | No change |
| Bill-To Address Line 2 | No action | No change |
| Bill-To Zip Code | No action | No change |
| Bill-To Zip Code 9 | No action | No change |
| Bill-To City | No action | No change |
| Bill-To State | No action | No change |
| Bill-To Country | No action | No change |
| Ship-To Title | No action | No change |
| Ship-To First Name | No action | No change |

TABLE 2-continued

Case 2 - Existing transaction - Transaction exists in Tagging database

| Field | Action | Existing transaction |
|---|---|---|
| Ship-To Last Name | No action | No change |
| Ship-To Address Line 1 | No action | No change |
| Ship-To Address Line 2 | No action | No change |
| Ship-To Zip Code | No action | No change |
| Ship-To Zip Code 9 | No action | No change |
| Ship-To City | No action | No change |
| Ship-To State | No action | No change |
| Ship-To Country | No action | No change |
| Total Order Quantity | No action | No change |
| Total Order Amount | No action | No change |
| Total Shipped Quantity | Update | Add "Total Shipped quantity" to existing |
| Total Shipped Amount | Update | Add "Total Shipped amount" to existing |
| Total Order Tax Amount | Update | Add "Total Order Tax amount" to existing |
| Total Order S&H Amount | Update | Add "Order S&H Amount" to existing |
| Total Order Discount Amount | Update | Add "Discount" to existing |
| Total Order Invoice Amount | Update | Add "Total Order Invoice Amount" to existing |
| Order Line Number | Update | Add one to the existing count |
| Source Order Number Item Number | No action | No change |
| Original Order Number (Populated only for returns) | Update | Add "Original Order Number" if it is empty |
| Order Line Quantity Ordered | | Update only when there is a partial sku cancellation - else remains the same |
| Order Line Quantity Shipped | Update | |
| Order Line Amount | | |
| Order Line Discount Amount | | |
| Order Line Invoice Amount | | |
| Offer AOV - Planned | | This is the value from Margin Module accurate at time of processing |
| Offer Breakeven - Planned | | |
| SKU Planned Cost | | |

TABLE 3

Case 3 - Existing transaction in Tagging database - Order is cancelled

| Field | Action | Change |
|---|---|---|
| IP Tag | No action | No change |
| Order # | No action | No change |
| Order Date | No action | No change |
| Order Time | No action | No change |
| Header Status | No action | No change |
| Order Code | No action | No change |
| Customer Number | No action | No change |
| MergedTo Customer Number | Update | If merged to customer number has changed then the value will be updated. Else it remains the same |
| Fulfillment Data Provider ID | | |
| Marketer ID | No action | No change |
| Offer ID | No action | No change |
| Payment Plan ID | No action | No change |
| MAR ID (to be looked up real time when generating reporting) | | |
| Channel | No action | No change |
| Disposition | | |

TABLE 3-continued

Case 3 - Existing transaction in Tagging database - Order is cancelled

| Field | Action | Change |
|---|---|---|
| Bill-To Telephone Number | No action | No change |
| Bill-To Title | No action | No change |
| Bill-To First Name | No action | No change |
| Bill-To Last Name | No action | No change |
| Bill-To Address Line 1 | No action | No change |
| Bill-To Address Line 2 | No action | No change |
| Bill-To Zip Code | No action | No change |
| Bill-To Zip Code 9 | No action | No change |
| Bill-To City | No action | No change |
| Bill-To State | No action | No change |
| Bill-To Country | No action | No change |
| Ship-To Title | No action | No change |
| Ship-To First Name | No action | No change |
| Ship-To Last Name | No action | No change |
| Ship-To Address Line 1 | No action | No change |
| Ship-To Address Line 2 | No action | No change |
| Ship-To Zip Code | No action | No change |
| Ship-To Zip Code 9 | No action | No change |
| Ship-To City | No action | No change |
| Ship-To State | No action | No change |
| Ship-To Country | No action | No change |
| Total Order Quantity | Update | Total Order Quantity -> Fulfillment (Negative value is added to existing value) |
| Total Order Amount | Update | Total Order Amount -> Fulfillment (Negative value is added to existing value) |
| Total Shipped Quantity | Update | No change - ETL should catch if value >0 is passed in raw data |
| Total Shipped Amount | Update | No change - ETL should catch if value >0 is passed in raw data |
| Total Order Tax Amount | Update | Total Order Tax Amount -> Fulfillment (Negative value is added to existing value) |
| Total Order S&H Amount | Update | Total Order Discount Amount -> Fulfillment (Negative value is added to existing value) |
| Total Order Discount Amount | Update | Total Order Discount Amount -> Fulfillment (Negative value is added to existing value) |
| Total Order Invoice Amount | Update | Total Order Invoice Amount -> Fulfillment (Negative value is added to existing value) |
| Order Line Number | | |
| Source Order Number | No action | No change |
| Item Number (to be looked up real time when generating reporting) | | |
| Original Order Number (to be looked up real time when generating reporting) | Update | Add "Original Order Number" if it is empty |
| Order Line Quantity Ordered (to be looked up real time when generating reporting) | | |
| Order Line Quantity Shipped (to be looked up real time when generating reporting) | | |
| Order Line Amount (to be looked up real time when generating reporting) | | |
| Order Line Discount Amount (to be looked up real time when generating reporting) | | |
| Order Line Invoice Amount (to be looked up real time when generating reporting) | | |
| Offer AOV - Planned | | |
| Offer Breakeven - Planned | | |
| SKU Planned Cost | | |

TABLE 4

Case 4 - New transaction in IP Tag database - Order is cancelled

| Field | Action | Change |
|---|---|---|
| IP Tag | Insert | IP - System generated |
| Order # | Insert | Fulfillment - Source Order Number |
| Order Date | Insert | Fulfillment - Order Date |
| Order Time | Insert | Web Order - OrderDate@web transaction/analytic data Call Center Order - CallStartDate@Call Center data |
| Header Status | Insert | OrderSource@FulfillmentOrder |
| Order Code | Insert | OrderCode@FulfillmentOrder |
| Customer Number | Insert | CustomerNumber@Fulfillment |
| MergedTo Customer Number | | Initially it will be CustomerNumber@Fulfillment. Later on when customer dedupe is in place this will be customer to which this record has been merged |
| Fulfillment Data Provider ID | | |
| Marketer ID | Insert | MarketerID -> FulfillmentOrder |
| Offer ID | Insert | OfferID from Payplan ID - IP generated |
| Payment Plan ID | Insert | Fulfillment - PaymentPlanCode |
| MAR ID (to be looked up real time when generating reporting) | Insert | |
| Channel | Insert | Fulfillment - OrderSource |
| Disposition | Insert | |
| Bill-To Telephone Number | Insert | Fulfillment |
| Bill-To Title | Insert | Fulfillment |
| Bill-To First Name | Insert | Fulfillment |
| Bill-To Last Name | Insert | Fulfillment |
| Bill-To Address Line 1 | Insert | Fulfillment |
| Bill-To Address Line 2 | Insert | Fulfillment |
| Bill-To Zip Code | Insert | Fulfillment |
| Bill-To Zip Code 9 | Insert | Fulfillment |
| Bill-To City | Insert | Fulfillment |
| Bill-To State | Insert | Fulfillment |
| Bill-To Country | Insert | Fulfillment |
| Ship-To Title | Insert | Fulfillment |
| Ship-To First Name | Insert | Fulfillment |
| Ship-To Last Name | Insert | Fulfillment |
| Ship-To Address Line 1 | Insert | Fulfillment |
| Ship-To Address Line 2 | Insert | Fulfillment |
| Ship-To Zip Code | Insert | Fulfillment |
| Ship-To Zip Code 9 | Insert | Fulfillment |
| Ship-To City | Insert | Fulfillment |
| Ship-To State | Insert | Fulfillment |
| Ship-To Country | Insert | Fulfillment |
| Total Order Quantity | Insert | Total Order Quantity -> Fulfillment (Negative value) |
| Total Order Amount | Insert | Total Order Amount -> Fulfillment (Negative value) |
| Total Shipped Quantity | Insert | Total Shipped Quantity -> Fulfillment |
| Total Shipped Amount | Insert | Total Shipped Amount -> Fulfillment |
| Total Order Tax Amount | Insert | Total Order Tax Amount -> Fulfillment |
| Total Order S&H Amount | Insert | Total Order S&H Amount -> Fulfillment |
| Total Order Discount Amount | Insert | Total Order Discount Amount -> Fulfillment |
| Total Order Invoice Amount | Insert | Total Order Invoice Amount -> Fulfillment |
| Order Line Number | Insert | |
| Source Order Number | Insert | Source Order Number -> Fulfillment |
| Item Number (to be looked up real time when generating reporting) | Insert | |
| Original Order Number (to be looked up real time when generating reporting) | Insert | Original Order Number -> Fulfillment |
| Order Line Quantity Ordered(to be looked up real time when generating | Insert | |

TABLE 4-continued

Case 4 - New transaction in IP Tag database - Order is cancelled

| Field | Action | Change |
|---|---|---|
| reporting) | | |
| Order Line Quantity Shipped(to be looked up real time when generating reporting) | Insert | |
| Order Line Amount (to be looked up real time when generating reporting) | Insert | |
| Order Line Discount Amount (to be looked up real time when generating reporting) | Insert | |
| Order Line Invoice Amount (to be looked up real time when generating reporting) | Insert | |
| Offer AOV - Planned | Insert | Sourced from Margin Module |
| Offer Breakeven - Planned | Insert | Sourced from Margin Module |
| SKU Planned Cost | Insert | Sourced from Margin Module |

TABLE 5

Case 5 - New transaction in Tagging database - Order is returned/repaired

| Field | Action | Change |
|---|---|---|
| IP Tag | Insert | IP - System generated |
| Order # | Insert | Fulfillment - Source Order Number |
| Order Date | Insert | Fulfillment - Order Date |
| Order Time | Insert | Web Order - OrderDate@web transaction/analytic data Call Center Order - CallStartDate@Call Center data |
| Header Status | Insert | OrderSource@FulfillmentOrder |
| Order Code | Insert | OrderCode@FulfillmentOrder |
| Customer Number | Insert | CustomerNumber@Fulfillment |
| MergedTo Customer Number | | Initially it will be CustomerNumberg@Fulfillment. Later on when customer dedupe is in place this will be customer to which this record has been merged |
| Fulfillment Data Provider ID | | |
| Marketer ID | Insert | MarketerID -> FulfillmentOrder |
| Offer ID | Insert | Offer ID from Payplan ID - IP generated |
| Payment Plan ID | Insert | Fulfillment - PaymentPlanCode |
| MAR ID | Insert | |
| Channel | Insert | Fulfillment - OrderSource |
| Disposition | Insert | |
| Bill-To Telephone Number | Insert | Fulfillment |
| Bill-To Title | Insert | Fulfillment |
| Bill-To First Name | Insert | Fulfillment |
| Bill-To Last Name | Insert | Fulfillment |
| Bill-To Address Line 1 | Insert | Fulfillment |
| Bill-To Address Line 2 | Insert | Fulfillment |
| Bill-To Zip Code | Insert | Fulfillment |
| Bill-To Zip Code 9 | Insert | Fulfillment |
| Bill-To City | Insert | Fulfillment |
| Bill-To State | Insert | Fulfillment |
| Bill-To Country | Insert | Fulfillment |
| Ship-To Title | Insert | Fulfillment |
| Ship-To First Name | Insert | Fulfillment |
| Ship-To Last Name | Insert | Fulfillment |
| Ship-To Address Line 1 | Insert | Fulfillment |
| Ship-To Address Line 2 | Insert | Fulfillment |
| Ship-To Zip Code | Insert | Fulfillment |
| Ship-To Zip Code 9 | Insert | Fulfillment |

TABLE 5-continued

Case 5 - New transaction in Tagging database - Order is returned/repaired

| Field | Action | Change |
|---|---|---|
| Ship-To City | Insert | Fulfillment |
| Ship-To State | Insert | Fulfillment |
| Ship-To Country | Insert | Fulfillment |
| Total Order Quantity (If transaction is already with Header Status of X then this records should not come again and should be caught by ETL since an order can not be cancelled more than once) | Insert | Total Order Quantity -> Fulfillment (Negative value) |
| Total Order Amount | Insert | Total Order Amount -> Fulfillment (Negative value) |
| Total Shipped Quantity | Insert | Total Shipped Quantity -> Fulfillment (Negative value) |
| Total Shipped Amount | Insert | Total Shipped Amount -> Fulfillment (Negative value) |
| Total Order Tax Amount | Insert | Total Order Tax Amount -> Fulfillment (Negative value) |
| Total Order S&H Amount | Insert | Total Order S&H Amount -> Fulfillment |
| Total Order Discount Amount | Insert | Total Order Discount Amount -> Fulfillment |
| Total Order Invoice Amount | Insert | Total Order Invoice Amount -> Fulfillment |
| Order Line Number | Insert | |
| Source Order Number | Insert | Source Order Number -> Fulfillment |
| Item Number | Insert | |
| Original Order Number | Insert | Original Order Number -> Fulfillment |
| Order Line Quantity Ordered | Insert | |
| Order Line Quantity Shipped | Insert | |
| Order Line Amount | Insert | |
| Order Line Discount Amount | Insert | |
| Order Line Invoice Amount | Insert | |
| Offer AOV - Planned | Insert | Sourced from Margin Module |
| Offer Breakeven - Planned | Insert | Sourced from Margin Module |
| SKU Planned Cost | Insert | Sourced from Margin Module |

TABLE 6

Case 6 - Existing transaction in Tagging database - Order is returned/repaired

| Field | Action | Change |
|---|---|---|
| IP Tag | No action | No change |
| Order # | No action | No change |
| Order Date | No action | No change |
| Order Time | No action | No change |
| Header Status | No action | No change |
| Order Code | No action | No change |
| Customer Number | No action | No change |
| Merged To Customer Number | Update | If merged to customer number has changed then the value will be updated. Else it remains the same |
| Fulfillment Data Provider ID | | |
| Marketer ID | No action | No change |
| Offer ID | No action | No change |
| Payment Plan ID | No action | No change |
| MAR ID | No action | |
| Channel | No action | No change |
| Disposition | No action | No change |
| Bill-To Telephone Number | No action | No change |
| Bill-To Title | No action | No change |

TABLE 6-continued

Case 6 - Existing transaction in Tagging database - Order is returned/repaired

| Field | Action | Change |
|---|---|---|
| Bill-To First Name | No action | No change |
| Bill-To Last Name | No action | No change |
| Bill-To Address Line 1 | No action | No change |
| Bill-To Address Line 2 | No action | No change |
| Bill-To Zip Code | No action | No change |
| Bill-To Zip Code 9 | No action | No change |
| Bill-To City | No action | No change |
| Bill-To State | No action | No change |
| Bill-To Country | No action | No change |
| Ship-To Title | No action | No change |
| Ship-To First Name | No action | No change |
| Ship-To Last Name | No action | No change |
| Ship-To Address Line 1 | No action | No change |
| Ship-To Address Line 2 | No action | No change |
| Ship-To Zip Code | No action | No change |
| Ship-To Zip Code 9 | No action | No change |
| Ship-To City | No action | No change |
| Ship-To State | No action | No change |
| Ship-To Country | No action | No change |
| Total Order Quantity (If transaction is already with Header Status of X then this records should not come again and should be caught by ETL since an order can not be cancelled more than once) | Update | Total Order Quantity -> Fulfillment (Negative value is added to existing value only if Header Status of existing IP tagged transaction is = 'O') |
| Total Order Amount | Update | Total Order Amount -> Fulfillment (Negative value is added to existing value only if Header Status of existing IP tagged transaction is = 'O') |
| Total Shipped Quantity | Update | Total Shipped Quantity -> Fulfillment (Negative value is added to current amount) |
| Total Shipped Amount | Update | Total Shipped Amount -> Fulfillment (Negative value is added to current amount) |
| Total Order Tax Amount | Update | Total Order Tax Amount -> Fulfillment (Negative value is added to existing value only if Header Status of existing IP tagged transaction is = 'O') |
| Total Order S&H Amount | Update | Total Order Discount Amount -> Fulfillment (Negative value is added to existing value only if Header Status of existing IP tagged transaction is = 'O') |
| Total Order Discount Amount | Update | Total Order Discount Amount -> Fulfillment (Negative value is added to existing value only if Header Status of existing IP tagged transaction is = 'O') |
| Total Order Invoice Amount | Update | Total Order Invoice Amoun t-> Fulfillment (Negative value is added to existing value only if Header Status of existing IP tagged transaction is = 'O') |
| Order Line Number | | |
| Source Order Number Item Number | No action | No change |
| Original Order Number | Update | Add "Original Order Number" if it is empty |
| Order Line Quantity Ordered | | |
| Order Line Quantity Shipped | | |
| Order Line Amount | | |
| Order Line Discount Amount | | |
| Order Line Invoice Amount | | |
| Offer AOV - Planned | | |
| Offer Breakeven - Planned | | |
| SKU Planned Cost | | |

In some embodiments, the inventive computer systems can host a large number of users (e.g., at least 10, at least 100, at least 1,000, at least 10,000; at least 100,000; at least 1,000,000) and perform a large number of concurrent transactions (e.g., at least 1,000, at least 10,000; at least 100,000; at least 1,000,000).

In some embodiments, the inventive computer systems are based on a scalable computer and network architecture that incorporates various strategies for assessing the data, caching, searching, and database connection pooling. An example of the scalable architecture is an architecture that is capable of operating multiple servers. In embodiments, the computing system in accordance with the instant invention may include, but not limiting to, one or more programmed computers, systems employing distributed networking, or other type of system that might be used to transmit and process electronic data.

FIG. 1 depicts a block diagram of an exemplary system 100 in accordance with one or more embodiments. System 100 may include one or more user devices, e.g. user device 120-1, user device 120-2, and user device 120-3, network 130, server 150, database 155, software module 165, and server 180.

The one or more user devices, e.g. user device 120-1, user device 120-2, and user device 120-3, may any type of computing device, including a mobile telephone, a laptop, tablet, or desktop computer having, a netbook, a video game device, a pager, a smart phone, an ultra-mobile personal computer (UMPC), or a personal data assistant (PDA). The one or more user devices may run one or more applications, such as Internet browsers, mobile applications, voice calls, video games, videoconferencing, and email, among others. The one or more user devices may be any combination of computing devices. These devices may be coupled to network 130. Network 130 may provide network access, data transport and other services to the devices coupled to it. In general, network 130 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 130 may, again as an alternative or in conjunction with one or more of the above, implement a WiMAX architecture defined by the WiMAX forum. Network 130 may also comprise, for instance, a local area network (LAN), a wide area network (WAN), the Internet, a virtual LAN (VLAN), an enterprise LAN, a layer 3 virtual private network (VPN), an enterprise IP network, or any combination thereof Server 150 or server 180 may also be any type of computing device coupled to network 130, including but not limited to a personal computer, a server computer, a series of server computers, a mini computer, and a mainframe computer, or combinations thereof. Server 150 or server 180 may be a web server (or a series of servers) running a network operating system, examples of which may include but are not limited to Microsoft Windows Server, Novell NetWare, or Linux. Server 150 or server 180 may be used for and/or provide cloud and/or network computing. Although not shown in FIG. 1, server 150 and or server 180 may have connections to external systems like email, SMS messaging, text messaging, ad content providers, etc. Any of the features of server 150 may be also implemented in server 180 and vice versa.

Database 155 may be any type of database, including a database managed by a database management system (DBMS). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, Adaptive Server Enterprise, FileMaker, Microsoft Access, Microsoft SQL Server, MySQL, PostgreSQL, and a NoSQL implementation. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Software module 165 may be a module that is configured to send, process, and receive information at server 150. Software module 165 may provide another mechanism for sending and receiving data at server 150 besides handling requests through web server functionalities. Software module 165 may send and receive information using any technique for sending and receiving information between processes or devices including but not limited to using a scripting language, a remote procedure call, an email, a tweet, an application programming interface, Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof Although software module 165 may be described in relation to server 150, software module 165 may reside on any other device. Further, the functionality of software module 165 may be duplicated on, distributed across, and/or performed by one or more other devices, either in whole or in part.

Figure 2:
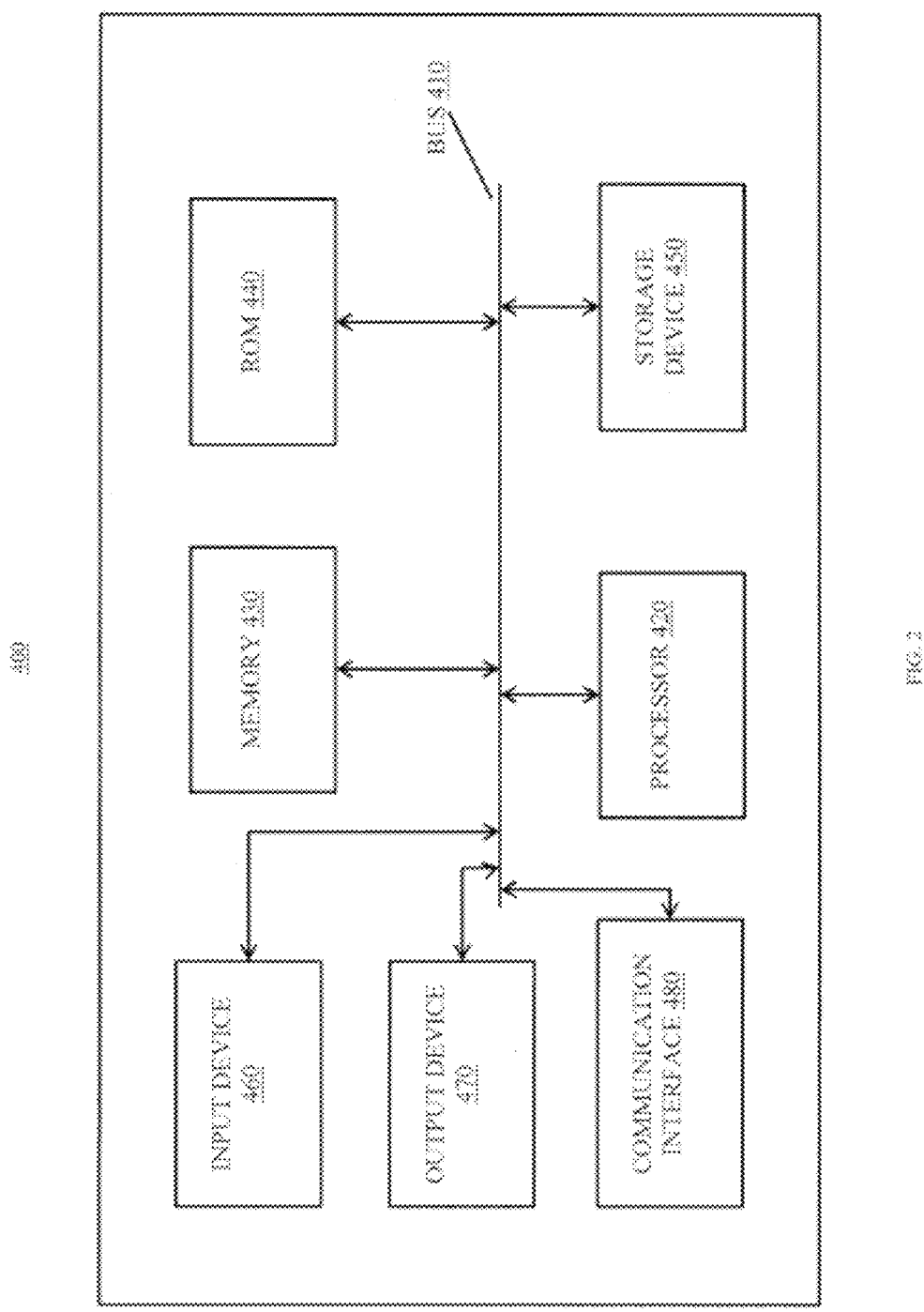
FIG. 2 depicts an exemplary architecture for implementing a computing device in accordance with one or more embodiments.

FIG. 2 depicts an exemplary architecture for implementing a computing device 400 in accordance with one or more embodiments, which may be used to implement any of the computing devices discussed herein, or any other computer system or computing device component thereof. It will be appreciated that other devices that can be used with the computing device 400, such as a client or a server, may be similarly configured. As illustrated in FIG. 4, computing device 400 may include a bus 410, a processor 420, a memory 430, a read only memory (ROM) 440, a storage device 450, an input device 460, an output device 470, and a communication interface 480. Bus 410 may include one or more interconnects that permit communication among the components of computing device 400. Processor 420 may include any type of processor, microprocessor, or processing logic that may interpret and execute instructions (e.g., a field programmable gate array (FPGA)). Processor 420 may include a single device (e.g., a single core) and/or a group of devices (e.g., multicore). Memory 430 may include a random access memory (RAM) or another type of dynamic storage device that may store information and instructions for execution by processor 420. Memory 430 may also be used to store temporary variables or other intermediate information during execution of instructions by processor 420.

ROM 440 may include a ROM device and/or another type of static storage device that may store static information and instructions for processor 420. Storage device 450 may include a magnetic disk and/or optical disk and its corresponding drive for storing information and/or instructions. Storage device 450 may include a single storage device or multiple storage devices, such as multiple storage devices operating in parallel. Moreover, storage device 450 may reside locally on the computing device 400 and/or may be remote with respect to a server and connected thereto via network and/or another type of connection, such as a dedicated link or channel.

Input device 460 may include any mechanism or combination of mechanisms that permit an operator to input information to computing device 400, such as a keyboard, a mouse, a touch sensitive display device, a microphone, a pen-based pointing device, and/or a biometric input device, such as a voice recognition device and/or a finger print scanning device. Output device 470 may include any mechanism or combination of mechanisms that outputs information to the operator, including a display, a printer, a speaker, etc.

Communication interface 480 may include any transceiver-like mechanism that enables computing device 400 to communicate with other devices and/or systems, such as a client, a server, a license manager, a vendor, etc. For example, communication interface 480 may include one or more interfaces, such as a first interface coupled to a network and/or a second interface coupled to a license manager. Alternatively, communication interface 480 may include other mechanisms (e.g., a wireless interface) for communicating via a network, such as a wireless network. In one implementation, communication interface 480 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 400 may perform certain functions in response to processor 420 executing software instructions contained in a computer-readable medium, such as memory 430. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments. It is worthy to note that any reference to "one embodiment" or "an embodiment" means that a particular feature, structure, or characteristic described in connection with the embodiment is included in at least one embodiment. The appearances of the phrases "in one embodiment" or "in some embodiments" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

While various exemplary embodiments have been described above, it should be understood that they have been presented by way of example only, and not limitation. Thus, the breadth and scope of the present disclosure should not be limited by any of the above-described exemplary embodiments.

What is claimed is:

1. A computer system, comprising:
   at least one specifically programmed server;
   at least one non-transitory tagging database accessible by the at least one specifically programmed server, wherein the at least one non-transitory tagging database is specifically programmed to be dedicated for use by the at least one specifically programmed server;
   wherein the at least one specifically programmed server comprises a plurality of modules configured to perform at least the following operations:
   electronically and periodically obtaining, over a computer network, by a media data programmed computer interface module of the at least one specifically programmed server, media data from a plurality of computer systems of media data sources, wherein the media data is associated with a plurality of marketers;
   verifying, by the media data programmed computer interface module of the at least one specifically programmed server, the media data in accordance with at least one predetermined media data database schema;
   populating, by the media data programmed computer interface module of the at least one specifically programmed server, media agency records of airings in at least one media data table of the at least one non-transitory tagging database based, at least in part, on:
   i) the media data, and
   ii) the at least one predetermined media data database schema;
   wherein the at least one predetermined media data database schema, comprising:
   a) at least one data field for marketer code identifier,
   b) at least one data field for creative code identifier,
   c) at least one data field for offer code identifier,
   d) at least one data field for network/station code identifier,
   e) at least one data field for date code identifier,
   f) at least one data field for time slot code identifier,
   g) at least one data field for payment type code identifier,
   h) at least one data field for phone number code identifier,
   i) at least one data field for internet address code identifier,
   j) at least one data field for response metric code identifier,
   k) at least one data field for country code identifier,
   l) at least one data field for language code identifier, and
   m) at least one data filed for airing length identifier;
   assigning, in real-time, by the media data programmed computer interface module of the at least one specifically programmed server, at least one media agency record identifier to each media data record in the at least one media data table, wherein each media data record corresponds to a particular airing of a particular creative;
   electronically and periodically obtaining, over a computer network, by a web data programmed computer interface module of the at least one specifically programmed server, web tracking transaction data from a computer system of at least one web tracking electronic source;
   wherein the web tracking transaction data comprising:
   i) web tracking metrics for at least one website associated with at least one offer of at least one creative, and
   ii) transactional web data for web orders made via the at least one website associated with the at least one offer of at least one creative;
   verifying, by the web data programmed computer interface module of the at least one specifically programmed server, the web tracking transaction data in accordance with at least one predetermined web tracking transaction database schema;
   populating, by the web data programmed computer interface module of the at least one specifically programmed server, at least one web data table in the at least one non-transitory tagging database based on the web tracking transaction data;
   electronically and periodically obtaining, over a computer network, by a call center data programmed computer interface module of the at least one specifically programmed server, call center transaction data from a computer system of at least one call center electronic source;
   wherein the call center transaction data comprising:

i) call center metrics for at least one phone number associated with the at least one offer of the at least one creative, and
ii) transactional call center data for call-center orders made via the at least one phone number associated with the at least one offer of the at least one creative;

verifying, by the call center data programmed computer interface module of the at least one specifically programmed server, the call center transaction data in accordance with at least one predetermined call center transaction database schema;

populating, by the call center data programmed computer interface module of the at least one specifically programmed server, at least one call center data table in the at least one non-transitory tagging database based on the call center transaction data;

electronically and real-time obtaining, over a computer network, by a fulfillment data programmed computer interface module of the at least one specifically programmed server, from a computer system of at least one fulfillment electronic source, fulfillment transaction data;

wherein the fulfillment transaction data comprising a plurality of at least thousand fulfillment records associated a plurality of at least thousand fulfillment transactions for the web orders, the call-center orders, or both;

wherein each fulfillment record identifies each fulfillment transaction being associated with a web order or a call-center order;

verifying, by the fulfillment data programmed computer interface module of the at least one specifically programmed server, the fulfillment transaction data in accordance with at least one predetermined fulfillment transaction database schema;

populating, by the fulfillment data programmed computer interface module of the at least one specifically programmed server, at least one fulfillment data table in the at least one non-transitory tagging database based on the fulfillment transaction data;

for each fulfillment transaction, determining, by the fulfillment data programmed computer interface module of the at least one specifically programmed server, a transaction type, wherein the transaction type is selected from the group of:
i) a new web order,
ii) a new call-center order,
iii) a new parts order for a replacement part, accessory, or both;
iv) a repair,
v) a return,
vi) a cancellation,
vii) a backorder,
viii) an installment payment, and
ix) a partial refund/discount;

associating, in real time, by a tagging data programmed computer module of the at least one specifically programmed server, media data records of airings of creatives to fulfillment transaction records in the at least one fulfillment data table, by matching, in real-time, records among at least the following data tables:
i) the at least one media data table;
ii) the at least one web data table,
iii) the at least one call center data table, and
iv) the at least one fulfillment data table;

for the matched records, continuously updating, in real-time, by the tagging data programmed computer module of the at least one specifically programmed server, at least one master records data table of the at least one non-transitory tagging database, by:
i) for each transaction in the fulfillment transaction data which is of the new web order or the new call-center order transaction type and is a new transaction for the at least one master records data, creating a corresponding master record having:
1) a unique master transaction tag identifier,
2) a multi-part tag code, wherein the multi-part tag code comprising:
a) a first part identifying a particular marketer associated with at least one product, at least one service, or both, being subject of such new web order or new call-center order,
b) a second part identifying the at least one fulfillment electronic source, and
c) a third part identifying a corresponding order identifier from the fulfillment transaction data,
3) a transaction detail part identifying fulfillment transaction details of such new transaction, and
4) a corresponding media agency record identifier, identifying a corresponding airing of a corresponding creative; and
ii) for each transaction which is identified in the fulfillment transaction data and is related to an existing master record,
a) creating a corresponding submaster record having:
1) a unique submaster transaction tag identifier,
2) the multi-part tag code, and
3) a transaction detail part identifying corresponding fulfillment transaction details; and
b) appending the unique submaster transaction tag identifier to the related existing master record;

continuously calculating, in real-time, by a margin value programmed computer module of the at least one specifically programmed server, a current value of a particular airing of a particular creative based on the continuously updating, in real-time, by the tagging data programmed computer module of the at least one specifically programmed server, the at least one master records data table, having a corresponding master record and at least one corresponding submaster record;

displaying, the at least one specifically programmed server, at least one graphical user interface, comprising a plurality of real-time updated look-up graphical items which are programmed to output at least one real-time report based on:
i) the continuously updating the at least one master records data table, and
ii) the continuously calculating the current value of the particular airing of the particular creative; and
wherein the plurality of real-time updated look-up graphical items are at least:
i) a look-up graphical item for selecting at least one country,
ii) a look-up graphical item for selecting at least one language,
iii) a look-up graphical item for selecting at least one product, at least one service, or both,
iv) a look-up graphical item for selecting at least one creative,
v) a look-up graphical item for selecting at least one campaign,
vi) a look-up graphical item for selecting a length of an airing,
vii) a look-up graphical item for selecting at least one offer, viii) a look-up graphical item for selecting at least one broadcast year,
ix) a look-up graphical item for selecting at least one broadcast week,
x) a look-up graphical item for selecting at least one network, at least one station, or both,
xi) a look-up graphical item for selecting a day of week,
xii) a look-up graphical item for selecting a time slot, and
xiii) a look-up graphical item for selecting a specific date range.

2. The computer system of claim 1, wherein the at least one predetermined media data database schema, further comprising:
n) a data field for marketer division code identifier, and
o) a data filed for marketer department code identifier; and
wherein the plurality of real-time updated look-up graphical items are at least:
xiv) a look-up graphical item for selecting at least one product division of at least one marketer, and
xv) a look-up graphical item for selecting at least one product department of the at least one marketer.

3. The computer system of claim 1, wherein the matching, in real-time, records between call-center records in the at least one call center data table and fulfillment records in the at least one fulfillment data table is based, at least in part, on:
i) an order date,
ii) a 5 digit Zip code,
iii) a last name,
iv) an order amount, and
v) optionally, a street name.

4. The computer system of claim 1, wherein the at least one web tracking electronic source is selected from the group consisting of: Piwik, Google Analytics, and Omniture.

5. The computer system of claim 1, wherein the matching, in real-time, fulfillment records in the at least one fulfillment data table to other records in the at least one non-transitory tagging database is based, at least in part, on the transaction type.

6. The computer system of claim 1, wherein the current value of the particular airing is a current net margin.

7. The computer system of claim 1, wherein the verifying, by the media data programmed computer interface module of the at least one specifically programmed server, the media data, comprising:
resolving, in real time, at least one of: overlapping records and duplicate records.

8. The computer system of claim 1, wherein the phone number is a toll-free phone number.

9. The computer system of claim 1, wherein the media data is media agency data and at least one media data source is an electronic computer system of a media agency.

10. A computer-implemented method, comprising:
electronically and periodically obtaining, over a computer network, by a media data programmed computer interface module of a at least one specifically programmed server, media data from a plurality of computer systems of media data sources, wherein the media data is associated with a plurality of marketers;
wherein the at least one specifically programmed server is operationally connected at least one non-transitory tagging database;
wherein the at least one non-transitory tagging database is specifically programmed to be dedicated for use by the at least one specifically programmed server;
verifying, by the media data programmed computer interface module of the at least one specifically programmed server, the media data in accordance with at least one predetermined media data database schema;
populating, by the media data programmed computer interface module of the at least one specifically programmed server, media agency records of airings in at least one media data table of the at least one non-transitory tagging database based, at least in part, on:
i) the media data, and
ii) the at least one predetermined media data database schema;
wherein the at least one predetermined media data database schema, comprising:
a) at least one data field for marketer code identifier,
b) at least one data field for creative code identifier,
c) at least one data field for offer code identifier,
d) at least one data field for network/station code identifier,
e) at least one data field for date code identifier,
f) at least one data field for time slot code identifier,
g) at least one data field for payment type code identifier,
h) at least one data field for phone number code identifier,
i) at least one data field for internet address code identifier,
j) at least one data field for response metric code identifier,
k) at least one data field for country code identifier,
l) at least one data field for language code identifier, and
m) at least one data filed for airing length identifier;
assigning, in real-time, by the media data programmed computer interface module of the at least one specifically programmed server, at least one media agency record identifier to each media data record in the at least one media data table, wherein each media data record corresponds to a particular airing of a particular creative;
electronically and periodically obtaining, over a computer network, by a web data programmed computer interface module of the at least one specifically programmed server, web tracking transaction data from a computer system of at least one web tracking electronic source;
wherein the web tracking transaction data comprising:
i) web tracking metrics for at least one website associated with at least one offer of at least one creative, and
ii) transactional web data for web orders made via the at least one website associated with the at least one offer of at least one creative;
verifying, by the web data programmed computer interface module of the at least one specifically programmed server, the web tracking transaction data in accordance with at least one predetermined web tracking transaction database schema;
populating, by the web data programmed computer interface module of the at least one specifically programmed server, at least one web data table in the at least one non-transitory tagging database based on the web tracking transaction data;
electronically and periodically obtaining, over a computer network, by a call center data programmed computer interface module of the at least one specifically programmed server, call center transaction data from a computer system of at least one call center electronic source;
wherein the call center transaction data comprising:
i) call center metrics for at least one phone number associated with the at least one offer of the at least one creative, and ii) transactional call center data for call-center orders made via the at least one phone number associated with the at least one offer of the at least one creative;

verifying, by the call center data programmed computer interface module of the at least one specifically programmed server, the call center transaction data in accordance with at least one predetermined call center transaction database schema;

populating, by the call center data programmed computer interface module of the at least one specifically programmed server, at least one call center data table in the at least one non-transitory tagging database based on the call center transaction data;

electronically and real-time obtaining, over a computer network, by a fulfillment data programmed computer interface module of the at least one specifically programmed server, from a computer system of at least one fulfillment electronic source, fulfillment transaction data;

wherein the fulfillment transaction data comprising a plurality of at least thousand fulfillment records associated a plurality of at least thousand fulfillment transactions for the web orders, the call-center orders, or both;

wherein each fulfillment record identifies each fulfillment transaction being associated with a web order or a call-center order;

verifying, by the fulfillment data programmed computer interface module of the at least one specifically programmed server, the fulfillment transaction data in accordance with at least one predetermined fulfillment transaction database schema;

populating, by the fulfillment data programmed computer interface module of the at least one specifically programmed server, at least one fulfillment data table in the at least one non-transitory tagging database based on the fulfillment transaction data;

for each fulfillment transaction, determining, by the fulfillment data programmed computer interface module of the at least one specifically programmed server, a transaction type, wherein the transaction type is selected from the group of:
i) a new web order,
ii) a new call-center order,
iii) a new parts order for a replacement part, accessory, or both;
iv) a repair,
v) a return,
vi) a cancellation,
vii) a backorder,
viii) an installment payment, and
ix) a partial refund/discount;

associating, in real time, by a tagging data programmed computer module of the at least one specifically programmed server, media data records of airings of creatives to fulfillment transaction records in the at least one fulfillment data table, by matching, in real-time, records among at least the following data tables:
i) the at least one media data table;
ii) the at least one web data table,
iii) the at least one call center data table, and
iv) the at least one fulfillment data table;

for the matched records, continuously updating, in real-time, by the tagging data programmed computer module of the at least one specifically programmed server, at least one master records data table of the at least one non-transitory tagging database, by:

i) for each transaction in the fulfillment transaction data which is of the new web order or the new call-center order transaction type and is a new transaction for the at least one master records data, creating a corresponding master record having:
1) a unique master transaction tag identifier,
2) a multi-part tag code, wherein the multi-part tag code comprising:
a) a first part identifying a particular marketer associated with at least one product, at least one service, or both, being subject of such new web order or new call-center order,
b) a second part identifying the at least one fulfillment electronic source, and
c) a third part identifying a corresponding order identifier from the fulfillment transaction data,
3) a transaction detail part identifying fulfillment transaction details of such new transaction, and
4) a corresponding media agency record identifier, identifying a corresponding airing of a corresponding creative; and ii) for each transaction which is identified in the fulfillment transaction data and is related to an existing master record,
a) creating a corresponding submaster record having:
1) a unique submaster transaction tag identifier,
2) the multi-part tag code, and
3) a transaction detail part identifying corresponding fulfillment transaction details; and
b) appending the unique submaster transaction tag identifier to the related existing master record;

continuously calculating, in real-time, by a margin value programmed computer module of the at least one specifically programmed server, a current value of a particular airing of a particular creative based on the continuously updating, in real-time, by the tagging data programmed computer module of the at least one specifically programmed server, the at least one master records data table, having a corresponding master record and at least one corresponding submaster record;

displaying, the at least one specifically programmed server, at least one graphical user interface, comprising a plurality of real-time updated look-up graphical items which are programmed to output at least one real-time report based on:
i) the continuously updating the at least one master records data table, and
ii) the continuously calculating the current value of the particular airing of the particular creative; and wherein the plurality of real-time updated look-up graphical items are at least:
i) a look-up graphical item for selecting at least one country,
ii) a look-up graphical item for selecting at least one language,
iii) a look-up graphical item for selecting at least one product, at least one service, or both,
iv) a look-up graphical item for selecting at least one creative,
v) a look-up graphical item for selecting at least one campaign,
vi) a look-up graphical item for selecting a length of an airing,
vii) a look-up graphical item for selecting at least one offer,
viii) a look-up graphical item for selecting at least one broadcast year, ix) a look-up graphical item for selecting at least one broadcast week,
x) a look-up graphical item for selecting at least one network, at least one station, or both,
xi) a look-up graphical item for selecting a day of week,
xii) a look-up graphical item for selecting a time slot, and
xiii) a look-up graphical item for selecting a specific date range.

11. The computer-implemented method of claim 10, wherein the at least one predetermined media data database schema, further comprising:
n) a data field for marketer division code identifier, and
o) a data filed for marketer department code identifier; and
wherein the plurality of real-time updated look-up graphical items are at least:
xiv) a look-up graphical item for selecting at least one product division of at least one marketer, and
xv) a look-up graphical item for selecting at least one product department of the at least one marketer.

12. The computer-implemented method of claim 10, wherein the matching, in real-time, records between call-center records in the at least one call center data table and fulfillment records in the at least one fulfillment data table is based, at least in part, on:
i) an order date,
ii) a 5 digit Zip code,
iii) a last name,
iv) an order amount, and
v) optionally, a street name.

13. The computer-implemented method of claim 10, wherein the at least one web tracking electronic source is selected from the group consisting of: Piwik, Google Analytics, and Omniture.

14. The computer-implemented method of claim 10, wherein the matching, in real-time, fulfillment records in the at least one fulfillment data table to other records in the at least one non-transitory tagging database is based, at least in part, on the transaction type.

15. The computer-implemented method of claim 10, wherein the current value of the particular airing is a current net margin.

16. The computer-implemented method of claim 10, wherein the verifying, by the media data programmed computer interface module of the at least one specifically programmed server, the media data, comprising
resolving, in real time, at least one of: overlapping records and duplicate records.

17. The computer-implemented method of claim 10, wherein the phone number is a toll-free phone number.

18. The computer-implemented method of claim 10, wherein the media data is media agency data and at least one media data source is an electronic computer system of a media agency.

* * * * *